US011065931B1

(12) United States Patent
Keas et al.

(10) Patent No.: US 11,065,931 B1
(45) Date of Patent: Jul. 20, 2021

(54) ACTIVE SUSPENSION SYSTEM

(71) Applicants: Paul J. Keas, San Jose, CA (US);
Jonathan L. Hall, Emerald Hills, CA (US); Kan Zhou, Sunnyvale, CA (US);
Troy A. Carter, Sunnyvale, CA (US);
Neal M. Lackritz, Mountain View, CA (US)

(72) Inventors: Paul J. Keas, San Jose, CA (US);
Jonathan L. Hall, Emerald Hills, CA (US); Kan Zhou, Sunnyvale, CA (US);
Troy A. Carter, Sunnyvale, CA (US);
Neal M. Lackritz, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 133 days.

(21) Appl. No.: 16/129,984

(22) Filed: Sep. 13, 2018

Related U.S. Application Data

(60) Provisional application No. 62/559,165, filed on Sep. 15, 2017, provisional application No. 62/559,190, filed on Sep. 15, 2017.

(51) Int. Cl.
B60G 13/00 (2006.01)
B60G 17/019 (2006.01)

(52) U.S. Cl.
CPC .... *B60G 17/01908* (2013.01); *B60G 2202/40* (2013.01); *B60G 2400/10* (2013.01)

(58) Field of Classification Search
CPC ............ B60G 17/0157; B60G 17/0165; B60G 17/01933; B60G 17/01941; B60G 17/021; F16F 15/03; F16F 15/22
(Continued)

(56) References Cited

U.S. PATENT DOCUMENTS 2,901,239 A 7/1959 Sethna
3,236,334 A 2/1966 Wallerstein
(Continued)

FOREIGN PATENT DOCUMENTS

CN 108215946 A 6/2018
CN 208439009 U 1/2019
(Continued)

OTHER PUBLICATIONS

Monroe Intelligent Suspension, "CVSA2/Kinetic: Low Energy for High Performance", www.monroeintelligentsuspension.com/products/cvsa2-kinetic/, Date Unknown, Downloaded Mar. 2, 2017, 2 pp.
(Continued)

*Primary Examiner* — Christopher P Schwartz
(74) *Attorney, Agent, or Firm* — Young Basile Hanlon & MacFarlane, P.C.

(57) ABSTRACT

A suspension system includes a primary actuator, an inertial actuator, and a controller. The primary actuator applies force between a sprung mass and an unsprung mass of a vehicle to control movement therebetween. The inertial actuator applies force between the unsprung mass and a reaction mass to damp movement of the unsprung mass. The inertial actuator has a threshold capacity. The controller controls the primary actuator and the inertial actuator. The controller determines a required damping of the movement of the unsprung mass, and apportions the required damping between the primary actuator and the inertial actuator.

26 Claims, 15 Drawing Sheets

(58) Field of Classification Search
USPC .... 188/266, 266.1, 266.5; 180/65.31, 65.51; 280/5.505, 5.515, 124.108, 124.157, 280/124.159, 124.16
See application file for complete search history.

(56) References Cited

U.S. PATENT DOCUMENTS

| | | | |
|---|---|---|---|
| 3,322,379 | A | 5/1967 | Flannelly |
| 3,368,824 | A | 2/1968 | Julien |
| 3,441,238 | A | 4/1969 | Flannelly |
| 3,781,032 | A | 12/1973 | Jones |
| 3,970,162 | A | 7/1976 | Le Salver et al. |
| 4,530,514 | A | 7/1985 | Ito |
| 4,537,420 | A | 8/1985 | Ito et al. |
| 4,589,678 | A | 5/1986 | Lund |
| 4,613,152 | A | 9/1986 | Booher |
| 4,634,142 | A | 1/1987 | Woods et al. |
| 4,637,628 | A | 1/1987 | Perkins |
| 4,643,270 | A | 2/1987 | Beer |
| 4,784,378 | A | 11/1988 | Ford |
| 4,834,416 | A | 5/1989 | Shimoe et al. |
| 4,893,832 | A | 1/1990 | Booher |
| 4,922,159 | A | 5/1990 | Phillips et al. |
| 4,960,290 | A | 10/1990 | Bose |
| 4,981,309 | A | 1/1991 | Froeschle et al. |
| 4,991,698 | A | 2/1991 | Hanson |
| 5,033,028 | A | 7/1991 | Browning |
| 5,060,959 | A | 10/1991 | Davis et al. |
| 5,244,053 | A | 9/1993 | Kashiwagi |
| 5,364,081 | A | 11/1994 | Hartl |
| 5,401,053 | A | 3/1995 | Sahm et al. |
| 5,409,254 | A | 4/1995 | Minor et al. |
| 5,468,055 | A | 11/1995 | Simon et al. |
| 5,507,518 | A | 4/1996 | Nakahara et al. |
| 5,517,414 | A | 5/1996 | Hrovat |
| 5,645,250 | A | 7/1997 | Gevers |
| 5,678,847 | A | 10/1997 | Izawa et al. |
| 5,810,335 | A | 9/1998 | Wirtz et al. |
| 5,829,764 | A | 11/1998 | Griffiths |
| 5,880,542 | A | 3/1999 | Leary et al. |
| 6,032,770 | A | 3/2000 | Alcone et al. |
| 6,113,119 | A | 9/2000 | Laurent et al. |
| 6,170,838 | B1 | 1/2001 | Laurent et al. |
| 6,233,510 | B1 | 5/2001 | Platner et al. |
| 6,249,728 | B1 | 6/2001 | Streiter |
| 6,314,353 | B1 | 11/2001 | Ohsaku et al. |
| 6,357,770 | B1 | 3/2002 | Carpiaux et al. |
| 6,364,078 | B1 | 4/2002 | Parison et al. |
| 6,443,436 | B1 | 9/2002 | Schel |
| 6,470,248 | B2 | 10/2002 | Shank et al. |
| 6,502,837 | B1 | 1/2003 | Hamilton et al. |
| 6,634,445 | B2 | 10/2003 | Dix et al. |
| 6,637,561 | B1 | 10/2003 | Collins et al. |
| 6,873,891 | B2 | 3/2005 | Moser et al. |
| 6,926,288 | B2 | 8/2005 | Bender |
| 6,940,248 | B2 | 9/2005 | Maresca et al. |
| 6,945,541 | B2 | 9/2005 | Brown |
| 7,017,690 | B2 | 3/2006 | Burke |
| 7,032,723 | B2 | 4/2006 | Quaglia et al. |
| 7,051,851 | B2 | 5/2006 | Svartz et al. |
| 7,140,601 | B2 | 11/2006 | Nesbitt et al. |
| 7,195,250 | B2 | 3/2007 | Knox et al. |
| 7,202,577 | B2 | 4/2007 | Parison et al. |
| 7,302,825 | B2 | 12/2007 | Knox |
| 7,308,351 | B2 | 12/2007 | Knoop et al. |
| 7,392,997 | B2 | 7/2008 | Sanville et al. |
| 7,401,794 | B2 | 7/2008 | Laurent et al. |
| 7,421,954 | B2 | 9/2008 | Bose |
| 7,427,072 | B2 | 9/2008 | Brown |
| 7,484,744 | B2 | 2/2009 | Galazin et al. |
| 7,502,589 | B2 | 3/2009 | Howard et al. |
| 7,543,825 | B2 | 6/2009 | Yamada |
| 7,551,749 | B2 | 6/2009 | Rosen et al. |
| 7,641,010 | B2 | 1/2010 | Mizutani et al. |
| 7,644,938 | B2 | 1/2010 | Yamada |
| 7,654,540 | B2 | 2/2010 | Parison et al. |
| 7,818,109 | B2 | 10/2010 | Scully |
| 7,823,891 | B2 | 11/2010 | Bushko et al. |
| 7,932,684 | B2 | 4/2011 | O'Day et al. |
| 7,962,261 | B2 | 6/2011 | Bushko et al. |
| 7,963,529 | B2 | 6/2011 | Oteman et al. |
| 7,976,038 | B2 | 7/2011 | Gregg |
| 8,047,551 | B2 | 11/2011 | Morris et al. |
| 8,067,863 | B2 | 11/2011 | Giovanardi |
| 8,095,268 | B2 | 1/2012 | Parison et al. |
| 8,099,213 | B2 | 1/2012 | Zhang et al. |
| 8,109,371 | B2 | 2/2012 | Kondo et al. |
| 8,112,198 | B2 | 2/2012 | Parison, Jr. et al. |
| 8,113,522 | B2 | 2/2012 | Oteman et al. |
| 8,127,900 | B2 | 3/2012 | Inoue |
| 8,157,036 | B2 | 4/2012 | Yogo et al. |
| 8,191,874 | B2 | 6/2012 | Inoue et al. |
| 8,282,149 | B2 | 10/2012 | Kniffin et al. |
| 8,336,319 | B2 | 12/2012 | Johnston et al. |
| 8,356,861 | B2 | 1/2013 | Kniffin et al. |
| 8,360,387 | B2 | 1/2013 | Breen et al. |
| 8,370,022 | B2 | 2/2013 | Inoue et al. |
| 8,387,762 | B2 | 3/2013 | Kondo et al. |
| 8,417,417 | B2 | 4/2013 | Chen et al. |
| 8,428,305 | B2 | 4/2013 | Zhang et al. |
| 8,466,639 | B2 | 6/2013 | Parison, Jr. et al. |
| 8,490,761 | B2 | 7/2013 | Kondo |
| 8,499,903 | B2 | 8/2013 | Sakuta et al. |
| 8,548,678 | B2 | 10/2013 | Ummethala et al. |
| 8,579,311 | B2 | 11/2013 | Butlin, Jr. et al. |
| 8,641,052 | B2 | 2/2014 | Kondo et al. |
| 8,641,053 | B2 | 2/2014 | Pare et al. |
| 8,668,060 | B2 | 3/2014 | Kondo et al. |
| 8,682,530 | B2 | 3/2014 | Nakamura |
| 8,701,845 | B2 | 4/2014 | Kondo |
| 8,725,351 | B1 | 5/2014 | Selden et al. |
| 8,744,680 | B2 | 6/2014 | Rieger et al. |
| 8,744,694 | B2 | 6/2014 | Ystueta |
| 8,757,309 | B2 | 6/2014 | Schmitt et al. |
| 8,783,430 | B2 | 7/2014 | Brown |
| 8,890,461 | B2 | 11/2014 | Knox et al. |
| 8,930,074 | B1 | 1/2015 | Lin |
| 8,938,333 | B2 | 1/2015 | Bose et al. |
| 9,062,983 | B2 | 6/2015 | Zych |
| 9,079,473 | B2 | 7/2015 | Lee et al. |
| 9,102,209 | B2 | 8/2015 | Giovanardi et al. |
| 9,291,300 | B2 | 3/2016 | Parker et al. |
| 9,316,667 | B2 | 4/2016 | Ummethala et al. |
| 9,349,304 | B2 | 5/2016 | Sangermano, II et al. |
| 9,399,384 | B2 | 7/2016 | Lee et al. |
| 9,533,539 | B2 | 1/2017 | Eng et al. |
| 9,550,495 | B2 | 1/2017 | Tatourian et al. |
| 9,625,902 | B2 | 4/2017 | Knox |
| 9,643,467 | B2 | 5/2017 | Selden et al. |
| 9,702,349 | B2 | 7/2017 | Anderson et al. |
| 9,855,887 | B1 | 1/2018 | Potter et al. |
| 9,868,332 | B2 | 1/2018 | Anderson et al. |
| 9,975,391 | B2 | 5/2018 | Tseng et al. |
| 10,065,474 | B2 | 9/2018 | Trangbaek |
| 10,093,145 | B1 | 10/2018 | Vaughan et al. |
| 10,245,984 | B2 | 4/2019 | Parker et al. |
| 10,300,760 | B1 | 5/2019 | Aikin et al. |
| 10,315,481 | B2 | 6/2019 | Lu et al. |
| 10,377,371 | B2 | 8/2019 | Anderson et al. |
| 10,513,161 | B2 | 12/2019 | Anderson et al. |
| 2003/0030241 | A1 | 2/2003 | Lawson |
| 2004/0074720 | A1 | 4/2004 | Thieltges |
| 2004/0094912 | A1 | 5/2004 | Niwa et al. |
| 2004/0226788 | A1 | 11/2004 | Tanner |
| 2005/0051986 | A1 | 3/2005 | Galazin et al. |
| 2005/0096171 | A1 | 5/2005 | Brown et al. |
| 2005/0199457 | A1 | 9/2005 | Beck |
| 2005/0206231 | A1 | 9/2005 | Lu et al. |
| 2005/0247496 | A1 | 11/2005 | Nagaya |
| 2006/0043804 | A1 | 3/2006 | Kondou |
| 2006/0076828 | A1 | 4/2006 | Lu et al. |
| 2006/0119064 | A1 | 6/2006 | Mizuno et al. |
| 2006/0181034 | A1 | 8/2006 | Wilde et al. |
| 2006/0266599 | A1 | 11/2006 | Denys et al. |

(56) References Cited

U.S. PATENT DOCUMENTS

| | | |
|---|---|---|
| 2006/0273530 A1 | 12/2006 | Zuber |
| 2007/0069496 A1 | 3/2007 | Rinehart et al. |
| 2007/0107959 A1 | 5/2007 | Suzuki et al. |
| 2007/0199750 A1 | 8/2007 | Suzuki et al. |
| 2007/0210539 A1 | 9/2007 | Hakui et al. |
| 2008/0017462 A1 | 1/2008 | Mizutani et al. |
| 2008/0100020 A1 | 5/2008 | Gashi et al. |
| 2008/0164111 A1* | 7/2008 | Inoue .................. B60G 17/021 188/297 |
| 2008/0185807 A1 | 8/2008 | Takenaka |
| 2008/0283315 A1 | 11/2008 | Suzuki et al. |
| 2009/0033055 A1 | 2/2009 | Morris et al. |
| 2009/0064808 A1 | 3/2009 | Parison et al. |
| 2009/0095584 A1 | 4/2009 | Kondo et al. |
| 2009/0120745 A1 | 5/2009 | Kondo et al. |
| 2009/0121398 A1 | 5/2009 | Inoue |
| 2009/0173585 A1 | 7/2009 | Kappagantu |
| 2009/0174158 A1 | 7/2009 | Anderson et al. |
| 2009/0198419 A1 | 8/2009 | Clark |
| 2009/0218867 A1 | 9/2009 | Clark |
| 2009/0243402 A1 | 10/2009 | O'Day et al. |
| 2009/0243598 A1 | 10/2009 | O'Day |
| 2009/0273147 A1 | 11/2009 | Inoue et al. |
| 2009/0286910 A1 | 11/2009 | Bloomfield |
| 2009/0302559 A1 | 12/2009 | Doerfel |
| 2009/0321201 A1 | 12/2009 | Sakuta et al. |
| 2010/0044977 A1 | 2/2010 | Hughes et al. |
| 2010/0059959 A1 | 3/2010 | Kim |
| 2010/0207344 A1* | 8/2010 | Nakamura ......... B60G 17/0157 280/124.108 |
| 2010/0222960 A1 | 9/2010 | Oida et al. |
| 2010/0252376 A1 | 10/2010 | Chern et al. |
| 2011/0115183 A1 | 5/2011 | Alesso et al. |
| 2012/0059547 A1 | 3/2012 | Chen et al. |
| 2012/0109483 A1 | 5/2012 | O'Dea et al. |
| 2012/0153718 A1 | 6/2012 | Rawlinson et al. |
| 2012/0181757 A1* | 7/2012 | Oteman ................ B60G 13/001 280/5.515 |
| 2012/0187640 A1 | 7/2012 | Kondo et al. |
| 2012/0193847 A1* | 8/2012 | Muragishi ............. F16F 7/1005 267/140.14 |
| 2012/0305348 A1 | 12/2012 | Katayama et al. |
| 2012/0306170 A1 | 12/2012 | Serbu et al. |
| 2013/0060422 A1 | 3/2013 | Ogawa et al. |
| 2013/0060423 A1 | 3/2013 | Jolly |
| 2013/0106074 A1 | 5/2013 | Koku et al. |
| 2013/0221625 A1 | 8/2013 | Pare et al. |
| 2013/0229074 A1 | 9/2013 | Haferman et al. |
| 2013/0233632 A1 | 9/2013 | Kim et al. |
| 2013/0253764 A1 | 9/2013 | Kikuchi et al. |
| 2013/0341143 A1 | 12/2013 | Brown |
| 2014/0005888 A1 | 1/2014 | Bose et al. |
| 2014/0145498 A1 | 5/2014 | Yamakado et al. |
| 2014/0156143 A1 | 6/2014 | Evangelou et al. |
| 2014/0260233 A1 | 9/2014 | Giovanardi et al. |
| 2014/0312580 A1 | 10/2014 | Gale |
| 2014/0358378 A1 | 12/2014 | Howard et al. |
| 2015/0123370 A1 | 5/2015 | Lee et al. |
| 2015/0197130 A1 | 7/2015 | Smith et al. |
| 2015/0224845 A1 | 8/2015 | Anderson et al. |
| 2015/0231942 A1 | 8/2015 | Trangbaek et al. |
| 2016/0059658 A1 | 3/2016 | Kuriki |
| 2016/0096458 A1 | 4/2016 | Parker et al. |
| 2016/0159187 A1 | 6/2016 | Mohamed |
| 2016/0167743 A1 | 6/2016 | Melcher |
| 2016/0291574 A1 | 10/2016 | Parison |
| 2016/0339823 A1 | 11/2016 | Smith et al. |
| 2016/0347143 A1 | 12/2016 | Hrovat et al. |
| 2017/0047823 A1 | 2/2017 | Sangermano, III et al. |
| 2017/0100980 A1 | 4/2017 | Tsuda |
| 2017/0129367 A1 | 5/2017 | Hein |
| 2017/0129371 A1 | 5/2017 | Knox |
| 2017/0129372 A1 | 5/2017 | Hein et al. |
| 2017/0129373 A1 | 5/2017 | Knox et al. |
| 2017/0137023 A1* | 5/2017 | Anderson ............. B60W 50/14 |
| 2017/0203673 A1 | 7/2017 | Parker et al. |
| 2017/0240018 A1 | 8/2017 | Mettrick et al. |
| 2017/0253101 A1 | 9/2017 | Kuriki |
| 2017/0253155 A1 | 9/2017 | Knox et al. |
| 2018/0015801 A1 | 1/2018 | Mohamed et al. |
| 2018/0022178 A1 | 1/2018 | Xi |
| 2018/0029585 A1 | 2/2018 | Tanimoto |
| 2018/0079272 A1 | 3/2018 | Aikin |
| 2018/0089901 A1 | 3/2018 | Rober et al. |
| 2018/0105082 A1 | 4/2018 | Knox |
| 2018/0126816 A1 | 5/2018 | Kondo et al. |
| 2018/0134111 A1 | 5/2018 | Toyohira et al. |
| 2018/0162186 A1 | 6/2018 | Anderson et al. |
| 2018/0162187 A1 | 6/2018 | Trangbaek |
| 2018/0297587 A1 | 10/2018 | Kasaiezadeh Mahabadi et al. |
| 2018/0345747 A1 | 12/2018 | Boon et al. |
| 2019/0023094 A1 | 1/2019 | Panagis et al. |
| 2019/0118604 A1 | 4/2019 | Suplin et al. |
| 2019/0248203 A1 | 8/2019 | Krehmer et al. |
| 2019/0308484 A1 | 10/2019 | Better et al. |
| 2020/0088214 A1 | 3/2020 | Woodard et al. |
| 2020/0171907 A1 | 6/2020 | Hall et al. |
| 2020/0216128 A1 | 7/2020 | Doerksen |

FOREIGN PATENT DOCUMENTS

| | | |
|---|---|---|
| DE | 102009060213 A1 | 6/2011 |
| DE | 202012002846 U1 | 7/2012 |
| DE | 102015003530 A1 | 9/2016 |
| DE | 102016000686 A1 | 7/2017 |
| DE | 102018208774 A1 | 12/2019 |
| EP | 2072855 A1 | 6/2009 |
| EP | 2233330 B1 | 2/2013 |
| EP | 3088230 A1 | 11/2016 |
| GB | 2437633 A | 10/2007 |
| JP | 2006200734 A | 8/2006 |
| JP | 2012002300 A | 1/2012 |
| JP | 2012167757 A | 9/2012 |
| JP | 2013244841 A | 12/2013 |
| JP | 5796315 B2 | 10/2015 |
| KR | 101509600 B1 | 4/2015 |
| WO | 9304883 A1 | 3/1993 |
| WO | 2012028228 A2 | 3/2012 |
| WO | 2014004118 A1 | 1/2014 |
| WO | 2014004119 A1 | 1/2014 |
| WO | 2014094934 A1 | 6/2014 |
| WO | 2015153811 A1 | 10/2015 |
| WO | 2015169530 A1 | 11/2015 |
| WO | 2016120044 A1 | 8/2016 |
| WO | 2017055151 A1 | 4/2017 |

OTHER PUBLICATIONS

Tenneco, "Integrated Kinetic, H2 CES System, Ride Control Innovation, Accelerated", Rev. Sep. 2011, 4 pp.

porsche.com, "Porsche AG: Porsche 918 RSR—Racing Laboratory With Even Higher-Performance Hybrid Drive—Porsche USA", Current Press Releases dated Jan. 10, 2011, Downloaded Mar. 13, 2017, www. porsche.com/usa/aboutporsche/pressreleases/pag/?pool=international-de&id-2011-01-10, 6 pp.

autoblog.com, "Porsche (finally) Unleashes Full, Official Details in 918 Spyder—Autoblog", Sep. 9, 2013, www.autoblog.com/2013/09/09/porsche-official-detials-918-spyder-frankfurt/, Downloaded Mar. 13, 2017, 26 pp.

press.porsche.com, "Introducing the Porsche 918 Spyder", Date Unknown, http://press.porsche.com/news/release.php?id=787, Downloaded Mar. 13, 2017, 7 pp.

Edren, Johannes, "Motion Modelling and Control Strategies of Over-Actuated Vehicles", Doctoral Thesis, Stockholm 2014 (56 pp).

Bolognesi, P., et al., "FEM Modeling and Analysis of a Novel Rotary-Linear Isotropic Brushless Machine", XIX International Conference of Electrical Machines—ICEM 2010, Rome (6 pp).

Xu, Lei, et. al., "Design and Analysis of a Double-Stator Linear-Rotary Permanent-Magnet Motor", IEEE Transactions on Applied Superconductivity, vol. 26, No. 4, Jun. 2016, (4 pp).

SAE International, "Michelin re-invents the wheel", Oct. 14, 2008, Downloaded Sep. 7, 2017, http://articles.sae.org/4604/ (2 pp).

(56) References Cited

OTHER PUBLICATIONS

Wikipedia, "Trailing-arm suspension", https://en.wikipedia.org/wiki/Trailing-arm_suspension, downloaded Sep. 3, 2019 (2 pp).
daimler.com, "Suspension: The world's first suspension system with 'eyes'", https://media.daimler.com/marsMediaSite/en/instance/ko/Suspension-The-worlds-first-suspension-system-with-eyes.xhtml?oid=9904306, May 15, 2013 (6 pp).
youtube.com., KSSofficial, "Miniature Ball Screw With Ball Spline / English", Published on May 10, 2013, https://www.youtube.com/watch?v=vkcxmM0iC8U (2 pp).
Nippon Bearing, "Ball Screw Spline SPBR/SPBF", Product Description, Date Unknown, Downloaded Jun. 28, 2019, https://www.nbcorporation.com/shop/ball-spline/spbr-spbf/ (2 pp).
Cosford, J., "Is it a fair fight? Hydraulics vs. electrics", https://www.mobilehydraulictips.com/fair-fight-hydraulics-vs-electrics/, Mar. 28, 2014 (10 pp).

\* cited by examiner

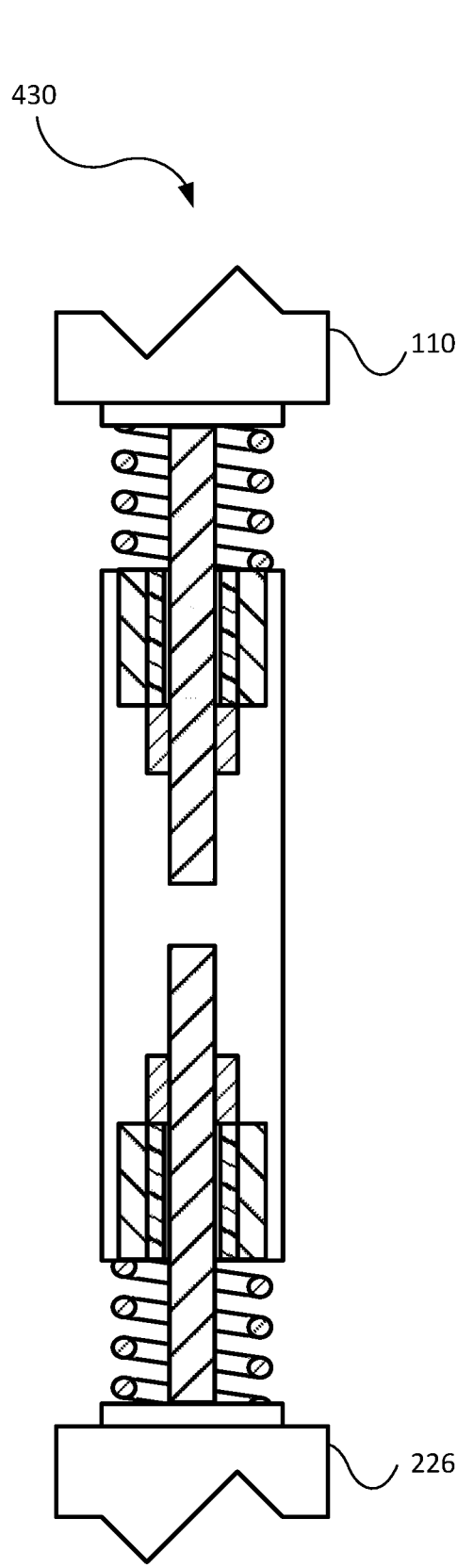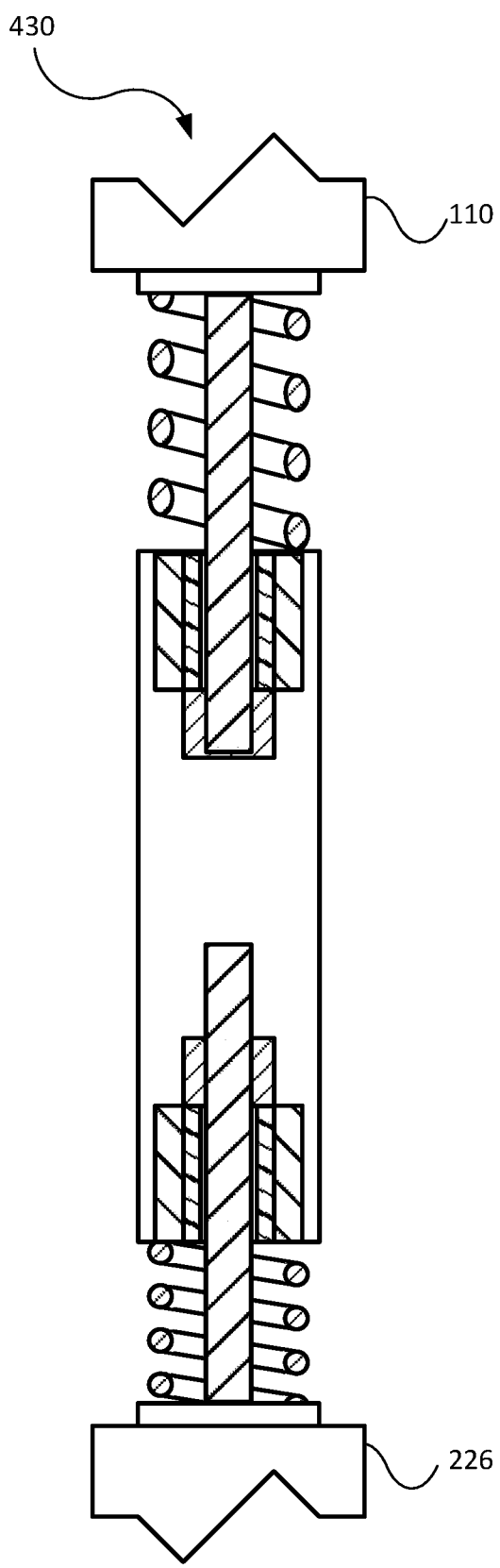
FIG. 4B
FIG. 4C

ACTIVE SUSPENSION SYSTEM

CROSS-REFERENCE TO RELATED APPLICATION(S)

This application Claims priority to and the benefit of U.S. Provisional Application No. 62/559,165, filed Sep. 15, 2017, and U.S. Provisional Application No. 62/559,190, filed Sep. 15, 2017, the entire disclosures of which are incorporated by reference herein.

TECHNICAL FIELD

This disclosure relates to suspension systems for vehicles and, in particular, active suspension systems.

BACKGROUND

Road vehicles include suspension systems that support a body of the vehicle on road surfaces over which the vehicles travel. The suspension system controls vertical movement of tire and wheel assemblies relative to the body due to road disturbances, so as to maintain contact of the tire and wheel assemblies with the road surface and to provide comfort to passengers in the vehicle body. Vertical movements of the unsprung mass due to road disturbances generally occur in a low frequency (e.g., around 3 Hz), which may be referred to primary ride. Additional vertical movements of the unsprung mass may occur in a higher frequency range due to dynamic characteristics of the unsprung mass (e.g., stiffness of the tire), which may be referred to as secondary ride or wheel hop. Typically, movements of the unsprung mass in the low and high frequency ranges are damped by passive fluid dampers, which extend and transfer force between the unsprung mass and the vehicle body.

SUMMARY

Disclosed herein are implementations of suspension assemblies and suspension actuator assemblies. In one implementation, a suspension actuator assembly includes a first actuator and a second actuator. The first actuator selectively applies a first force between an unsprung mass and a sprung mass of a vehicle to control movement therebetween. The second actuator selectively applies a second force between the unsprung mass and a reaction mass to damp movement of the unsprung mass. The second actuator is coupled to the first actuator to form the suspension actuator assembly as a singular unit.

In another implementation, a suspension assembly includes a suspension arm, a tire and wheel assembly, and a suspension actuator assembly. The suspension arm is pivotably coupleable to a vehicle body that forms a sprung mass. The tire and wheel assembly is coupled to the suspension arm to cooperatively form an unsprung mass. The suspension actuator assembly coupleable to the vehicle body and is coupled to the suspension arm. The suspension actuator assembly includes a first ball screw actuator and a second ball screw actuator. The first ball screw actuator includes a first motor, a first ball nut rotatable by the first motor, and a first shaft received by the first ball nut and axially movable relative thereto with rotation of the first ball nut by the first motor. The second ball screw actuator includes a second motor, a second ball nut rotatable by the second motor, and a second shaft received by the second ball nut and axially movable relative thereto with rotation of the second ball nut by the second motor. The second motor is coupled to the first motor in a fixed coaxial arrangement. The first ball screw actuator and the second ball screw actuator are operable to control movement between the vehicle body and the suspension arm, and are further operable to move the first motor and the second motor cooperatively as a reaction mass to damp movement of the unsprung mass.

In another implementation, a suspension assembly includes a suspension arm, a tire and wheel assembly, and a suspension actuator assembly. The suspension arm is pivotably coupleable to a vehicle body that forms a sprung mass. The tire and wheel assembly is coupled to the suspension arm to cooperatively form an unsprung mass. The suspension actuator assembly coupleable to the vehicle body and is coupled to the suspension arm. The suspension actuator assembly forms a ball screw actuator for controlling movement between the vehicle body and the suspension arm and forms an electromagnetic linear actuator for controlling movement between the suspension arm and a reaction mass.

In another implementation, a suspension system includes a primary actuator, an inertial actuator, and a controller. The primary actuator applies force between a sprung mass and an unsprung mass of a vehicle to control movement therebetween. The inertial actuator applies force between the unsprung mass and a reaction mass to damp movement of the unsprung mass. The inertial actuator has a threshold capacity. The controller controls the primary actuator and the inertial actuator. The controller determines a required damping of the movement of the unsprung mass, and apportions the required damping between the primary actuator and the inertial actuator.

In another implementation, a method is provided for controlling a suspension actuator assembly having a primary actuator and an inertial actuator for damping motion of an unsprung mass. The method includes: monitoring a position of a reaction mass of the inertial actuator and monitoring an acceleration of the unsprung mass; determining required damping from the acceleration; determining a predicted state of the inertial actuator according to the required damping and the position of the reaction mass, a velocity of the reaction mass, and the acceleration of the unsprung mass; determining whether the predicted state exceeds a capacity threshold of the inertial actuator; allocating the required damping between the inertial actuator and the primary actuator if the capacity threshold is determined to be exceeded by the predicted state; and controlling the primary actuator and the inertial actuator according to the allocation to perform the required damping.

In one implementation, a suspension system for a vehicle includes a primary actuator, an inertial actuator, and a control system. The primary actuator applies force between a sprung mass and an unsprung mass of the vehicle to control movement therebetween. The inertial actuator applies force between the unsprung mass and a reaction mass to damp movement of the unsprung mass at a natural frequency of the unsprung mass. The inertial actuator has a capacity threshold. The control system controls the force applied by the primary actuator and the force applied by the inertial actuator to damp the unsprung mass at the natural frequency according to the capacity threshold.

The control system may determine whether the capacity threshold of the inertial actuator will be exceeded by performing a required damping with the inertial actuator without the primary actuator. If the capacity threshold will be exceeded, the control system may control the inertial actuator and the primary actuator to cooperatively damp the unsprung mass, such as by cooperatively performing the required damping. If the capacity threshold will not be exceeded, the control system may control the inertial actuator to perform the required damping without the primary actuator.

In one implementation, a control system is for a suspension system of a vehicle. The vehicle includes a sprung mass and an unsprung mass. The suspension system includes a primary actuator for applying force between the sprung mass and the unsprung mass and includes an inertial actuator for applying force between the unsprung mass and a reaction mass. The control system includes a position sensor, an accelerometer, and a controller. The position sensor measures a position and a velocity of the reaction mass relative to the unsprung mass. The accelerometer measures acceleration of the unsprung mass. The controller: determines, according to the acceleration, a required damping of the unsprung mass at a natural frequency of the unsprung mass; determines, according to the acceleration, the position, and the velocity, a predicted state of the inertial actuator if the required damping were performed by the inertial actuator without the primary actuator; and compares the predicted state to a capacity threshold of the inertial actuator. If the predicted state exceeds the capacity threshold, the controller controls the inertial actuator and the primary actuator to cooperatively perform the required damping.

In one implementation, a method is provided for controlling a suspension system of a vehicle. The method includes: determining, with a controller, a required damping of an unsprung mass at a natural frequency of the unsprung mass, the unsprung mass including a wheel of the vehicle; determining, with the controller, whether an inertial actuator can perform an entirety of the required damping without exceeding a capacity threshold of the inertial actuator; controlling, with the controller, the inertial actuator and a primary actuator to cooperatively perform the required damping if the inertial actuator cannot perform the entirety of the required damping. The inertial actuator includes a reaction mass and an actuator mechanism for applying force between the unsprung mass and the reaction mass. The primary actuator is configured to apply force between the unsprung mass and a sprung mass of the vehicle.

The method may also include monitoring a position and a velocity of a reaction mass of the inertial actuator and monitoring an acceleration of the unsprung mass. The controller may determine the required damping from the acceleration. The controller may determine whether the inertial actuator can perform the entirety of the required damping by determining a predicted state of the inertial actuator according to the position of the reaction mass, the velocity of the reaction mass, and the acceleration of the unsprung mass. The controller may determine whether the predicted state exceeds the capacity threshold of the inertial actuator. The controller may control the primary actuator and the inertial actuator to cooperatively provide the required damping if the capacity threshold is determined to be exceeded by the predicted state. The controller may control the inertial actuator to perform the entirety of the required damping if the capacity threshold is determined to not be exceeded by the predicted state.

BRIEF DESCRIPTION OF THE DRAWINGS

FIG. 4B is a cross-sectional view of the suspension actuator of FIG. 4A shown in a second state.
FIG. 4C is a cross-sectional view of the suspension actuator of FIG. 4A shown in a third state.

DETAILED DESCRIPTION

Disclosed herein are embodiments of active suspension systems for a vehicle, which provide secondary ride control to damp or limit wheel hop. Unsprung masses of vehicles are generally formed by a wheel, a tire, and various suspension, steering, and braking components, which move relative to a vehicle body of the vehicle in a generally vertical direction. The unsprung mass has a characteristic frequency (e.g., a natural frequency), which may result in the unsprung mass resonating as a unit when force is input to the unsprung mass (e.g., by road disturbances) at or near the characteristic frequency of the unsprung mass. The characteristic frequency of the unsprung mass, which may also be referred to as a natural frequency or a wheel hop frequency, may be between approximately 5 Hz and 20 Hz, such as 10 Hz and 15 Hz, or around 12 Hz. However, the characteristic frequency may be higher or lower depending on properties of the various components forming the unsprung mass (e.g., tire stiffness, mass, material properties, among others).

Various embodiments of suspension systems disclosed herein include a reaction mass that is coupled to the unsprung mass and is moved (e.g., oscillated) relative thereto to damp movement of the unsprung mass in at the characteristic frequency or in a characteristic frequency range. As used herein, the term "characteristic frequency range" includes frequencies at or near the natural frequency of the unsprung mass at which force inputs may begin to induce resonance of the unsprung mass (e.g., the natural frequency+/−2 Hz, 1 Hz, 0.5 Hz, or less). Additionally, various embodiments of the suspension systems disclosed herein form a reaction mass with actuator components otherwise configured to provide primary ride control to damp or otherwise control movement of the unsprung mass relative to the sprung mass due to force input at frequencies outside the characteristic frequency range, such as in a low frequency range (e.g., below approximately 5 Hz; primary ride). Still further, a control system is provided for apportioning damping of movement in the characteristic frequency range between a secondary actuator and a primary actuator that additionally controls primary ride.

Figure 1:
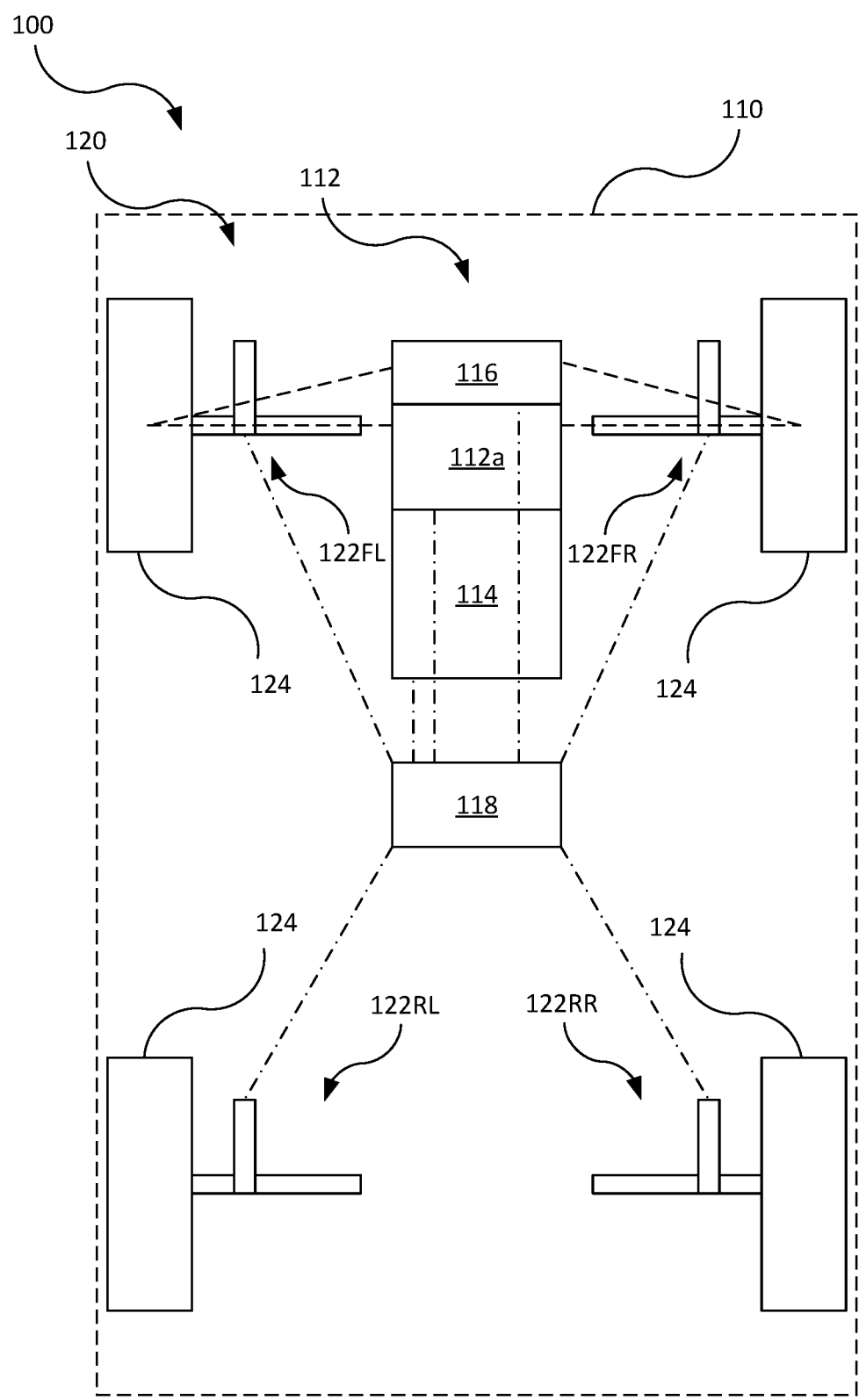
FIG. 1 is a schematic view of a vehicle.

Referring to FIG. 1, a vehicle 100 generally includes a vehicle body 110, a powertrain system 112, an energy storage system 114, a steering system 116, a controller 118, and a suspension system 120 having one or more suspension assemblies 122 (e.g., four). The vehicle 100 may additionally include a braking system (not shown). The powertrain system 112, for example, includes one or more electric motors 112*a* operably connected, such as via a gearbox and half-shafts, to two or more tire and wheel assemblies 124 to cause rotation thereof to propel the vehicle 100 along a roadway. The energy storage system 114, for example, includes a battery electrically connected to the powertrain system 112, the steering system 116, the suspension system 120, and/or the controller 118 for supplying power thereto. The steering system 116 is connected to the tire and wheel assemblies 124 (e.g., at a front end of the vehicle) and causes pivoting thereof about substantially vertical axes for directing the vehicle in left and right directions. The controller 118 is in communication, as indicated schematically by dash-dot lines, with the various systems of the vehicle 100, for example, including the powertrain system 112, the energy storage system 114, the steering system 116, the suspension system 120, and the braking system for control thereof. The controller 118 is discussed in further detail below with reference to FIG. 11.

The suspension system 120 may include one of the suspension assemblies 122, such as a front left suspension assembly 122FL, a front right suspension assembly 122FR, a rear left suspension assembly 122RL, and a rear right suspension assembly 122RR. Each suspension assembly may be considered to include one of the tire and wheel assemblies 124.

Figure 2:
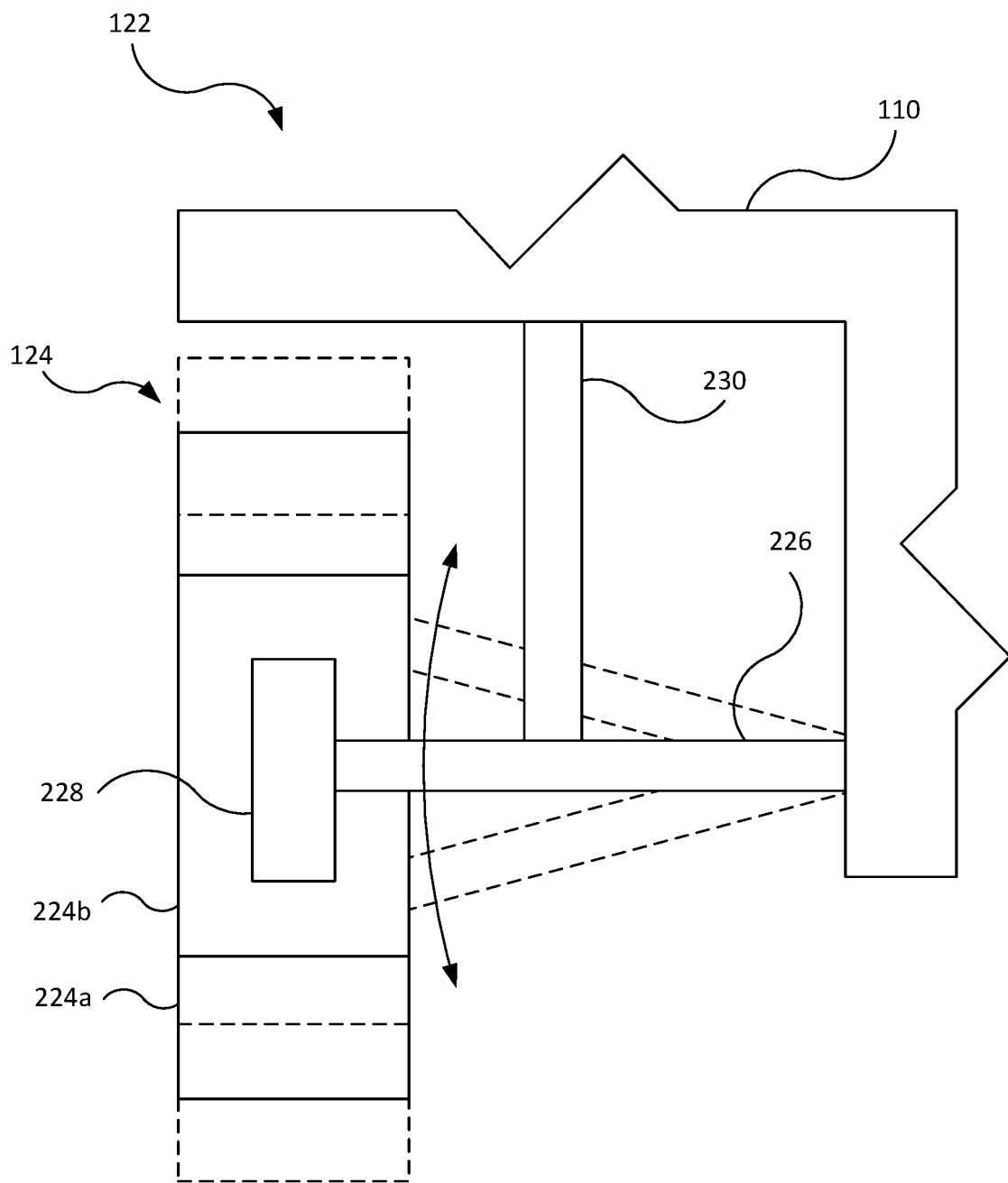
FIG. 2 is a schematic view of a suspension assembly connected to a vehicle body.

Referring to FIG. 2, the one or more suspension assemblies 122 generally includes the tire and wheel assembly 124 having a tire 224*a* and a wheel 224*b*, a suspension arm 226, a steering knuckle 228, and a suspension actuator assembly 230 (e.g., suspension actuator assembly). The suspension arm 226 pivotably couples the tire and wheel assembly 124 to the vehicle body 110 to allow vertical motion of the tire and wheel assembly 124 relative to the vehicle body 110. The steering knuckle 228 pivotably couples the tire and wheel assembly 124 to the suspension arm 226 to allow pivoting about an upright (e.g., generally vertical) axis of the tire and wheel assembly 124 relative to the suspension arm 226 and, thereby, the vehicle body 110. The suspension actuator assembly 230 extends between the suspension arm 226 and the vehicle body 110 and actively controls movement of the wheel and tire assembly 224 relative to the vehicle body 110. Portions of the suspension assembly 122 that move relative to the vehicle body 110, along with any brake components (e.g., disk brakes located within a hub of the wheel), powertrain components (e.g., half shafts coupling a drive source to the wheel 224*b*), and steering components (e.g., the steering knuckle 228) may be considered to form an unsprung mass, while the vehicle body 110 may be considered to form the sprung mass. The suspension actuator assembly 230 may, thereby, be considered to extend and transfer force between the sprung mass and the unsprung mass of the vehicle 100. The suspension actuator assembly 230, while shown and described for illustrative purposes in one non-limiting example as extending between the suspension arm 226 and the vehicle body 110, may extend or otherwise transfer force between any suitable portion of the unsprung mass (e.g., the suspension arm 226 or the steering knuckle 228) and any suitable portion of the sprung mass (e.g., the vehicle body 110 or other structure fixed thereto). Similarly, the other suspension actuator assemblies described below (e.g., suspension actuator assemblies 430, 530, 630, 730, 830) may extend or otherwise transfer force between the suspension arm 226 or other suitable portion of the unsprung mass (e.g., the steering knuckle 228) and the vehicle body 110 or other suitable portion of the sprung mass (e.g., structures fixed to the vehicle body 110).

Figure 3A:
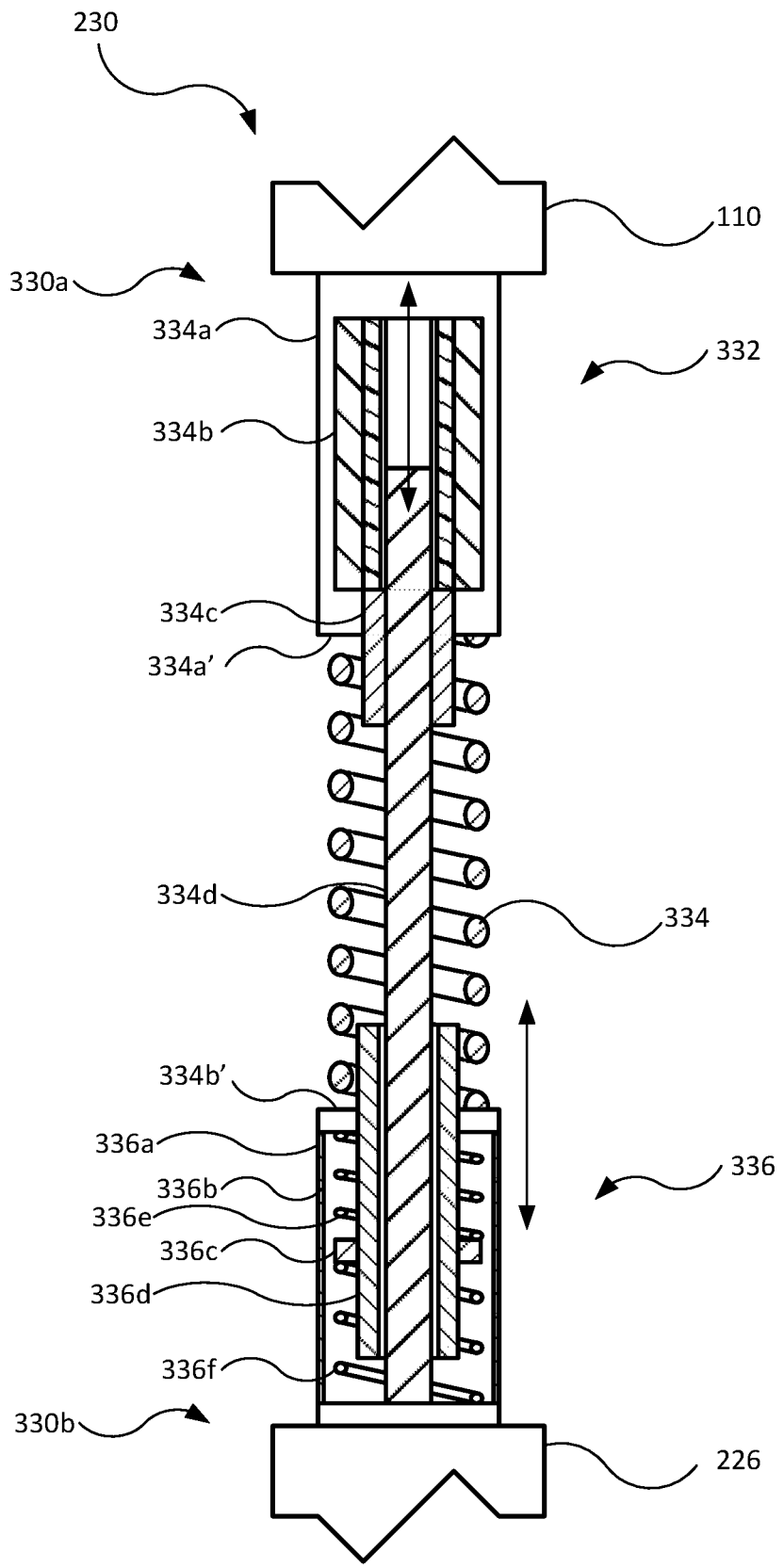
FIG. 3A is a cross-sectional view of a suspension actuator for use in the suspension assembly shown in FIG. 2, the suspension actuator being shown in a first state.
Figure 3B:
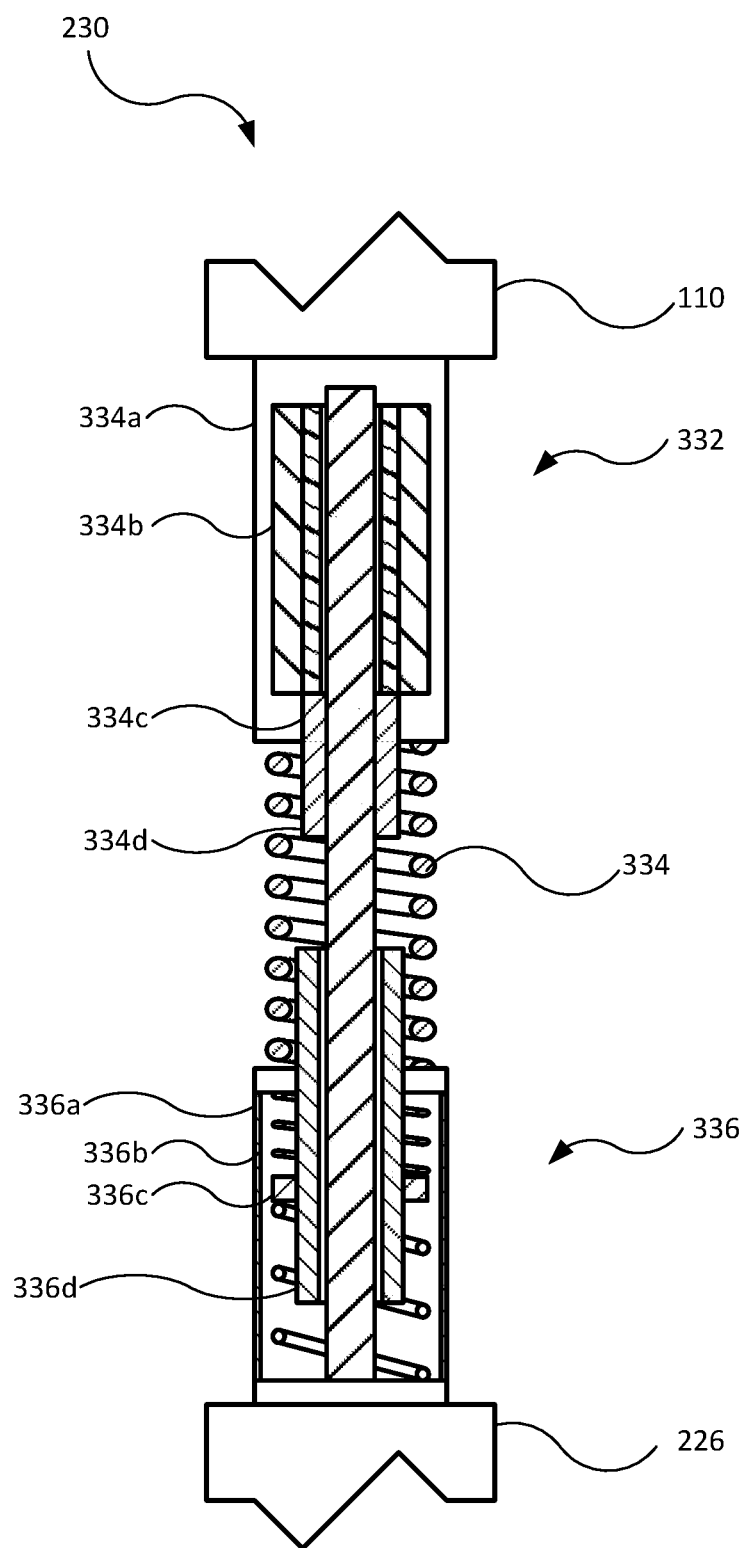
FIG. 3B is a cross-sectional view of the suspension actuator of FIG. 3A shown in a second state.

Referring to the detail view of FIGS. 3A-3B, the suspension actuator assembly 230 is operated to control movement between the wheel and tire assembly 224 relative to the vehicle body 110. The suspension actuator assembly 230 is coupled at an upper end 330*a* (e.g., first end, or first or upper mount) thereof to the vehicle body 110 and at a lower end 330*b* (e.g., second end, or second or lower mount) thereof to the suspension arm 226 (or other suitable portion of the unsprung mass, such as the steering knuckle 226). As the wheel and tire assembly 224 moves vertically toward and away from the vehicle body 110, the suspension actuator assembly 230, respectively, compresses axially and extends axially (compare FIGS. 3A and 3B showing the suspension actuator assembly 230 in two states). The suspension actuator assembly 230 may also pivot at the upper end 330*a* and/or the lower end 330*b* as the wheel and tire assembly 224 moves relative to the vehicle body 110.

The suspension actuator assembly 230 generally includes a primary actuator 332, a spring 334, and a secondary actuator 336. The primary actuator 332 is configured to control movement in the low frequency range (e.g., primary ride range) by transferring loading between the unsprung mass (e.g., the tire and wheel assembly 124) and the sprung mass (e.g., the vehicle body 110), and may also be capable of damping movement of the unsprung mass in the high frequency range (e.g., secondary ride range or wheel hop range). The secondary actuator 336 is configured to damp movement of the unsprung mass in the characteristic frequency range (e.g., secondary ride or wheel hop) by transferring loading between the unsprung mass and a reaction mass. The secondary actuator 336 may also be referred to as an inertial actuator or a reaction mass actuator. The suspension actuator assembly 230 may be provided as a singular assembly, which may be installed as a singular unit to the vehicle 100, for example, by being coupled by the upper end 330*a* and the lower end 330*b* thereof to the vehicle body 110 and the suspension arm 226, respectively.

The primary actuator 332 and the spring 334 form parallel load paths between the vehicle body 110 and the suspension arm 226 to control movement therebetween. More particularly, the primary actuator 332 transfers force between the vehicle body 110 and the suspension arm 226, and is actuable to apply force (e.g., selectively applies a first force) therebetween to resist or cause movement between the vehicle body 110 and the suspension arm 226 to control movement therebetween. For example, the primary actuator 332 may be coupled to and extend upright between the vehicle body 110 and the suspension arm 226.

The primary actuator 332 is configured as linear actuator, such as a ball screw actuator that generally includes an actuator body 334a, an electric motor 334b, a nut 334c, and a shaft 334d. The actuator body 334a is connected at the upper end 330a of the suspension actuator assembly 230 to the vehicle body 110. The electric motor 334b is an electric motor having a stator fixedly coupled to the actuator body 334a and a rotor rotatable relative thereto. The nut 334c is configured as a ball nut that is fixedly coupled to the rotor of the electric motor 334b and is threadably connected to the shaft 334d (e.g., having recirculating balls that engage internal threads of the nut 334c and external threads of the shaft 334d). The shaft 334d is rotatably fixed relative to the stator, so as to not rotate relative thereto. As alternatives to a ball screw actuator, the primary actuator 332 may be another type of linear actuator, such as an electromagnetic linear motor or direct drive linear motor (e.g., a tubular linear motor, or a planar linear motor).

The electric motor 334b is configured to apply force between the vehicle body 110 and the suspension arm 226, which may include providing energy into the suspension assembly 122 (e.g., converting electrical energy into mechanical energy) and receiving energy therefrom (e.g., converting mechanical energy into electrical energy). When outputting energy, the electric motor 334b rotates the nut 334c, which causes the shaft 334d to extend axially away from the actuator body 334a and the electric motor 334b or to be received axially thereby, so as to move the tire and wheel assembly 124 away from or toward, respectively, the vehicle body 110. When receiving energy, the electric motor 334b is rotated by the nut 334c as the tire and wheel assembly 124 moves away from or toward the vehicle body 110 due to forces external to the electric motor 334b (e.g., from gravity, the spring 334, and/or the road surface acting on the tire and wheel assembly 124). Such external forces cause the shaft 334d to move away from or toward the actuator body 334a and the electric motor 334b to cause rotation of the nut 334c and the electric motor 334b. It should be noted that the electric motor 334b may receive energy, while still resisting external forces by applying a counter-torque to control movement of the tire and wheel assembly 124.

The spring 334, in parallel to the secondary actuator 336, presses the vehicle body 110 and the suspension arm 226 away from each other. For example, the spring 334 may press upward against a portion of the primary actuator 332 connected to the vehicle body 110 and press downward against a lower portion (e.g., mount) of the secondary actuator 336 connected to the suspension arm 226.

The secondary actuator 336 is a reaction mass actuator (e.g., an inertial actuator) that moves a reaction mass axially to damp movement of the unsprung mass (e.g., including the tire and wheel assembly 124, steering knuckle 228, etc.) in the characteristic frequency range. The secondary actuator 336 is, for example, coupled to the lower portion or mount of the secondary actuator 336, which is connected to the suspension arm 226. The secondary actuator 336 may be generally concentric with the spring 334 (e.g., being surrounded thereby).

The secondary actuator 336 may be configured as an electromagnetic linear actuator (e.g., a direct drive linear motor or a voice coil) having a housing 336a (e.g., body), a coil 336b axially fixed to the housing 336a, and a permanent magnet 336c that is moved axially when electrical current is sent through the coil 336b. Further, a mass member 336d is connected to the permanent magnet 336c to cooperatively form the reaction mass therewith, and is further suspended axially within the housing 336a by an upper spring 336e and a lower spring 336f. The permanent magnet 336c, the mass member 336d, the upper spring 336e, and the lower spring 336f form a combined mass-spring system, which may be tuned to the natural frequency of the unsprung mass against the road surface (e.g., formed in part by the stiffness of the tire 224a engaging the road surface).

The secondary actuator 336 is operated to damp movement of the unsprung mass in the characteristic frequency range. More particularly, the secondary actuator 336 applies force (e.g., oscillation force) between the unsprung mass (e.g., the suspension arm 226) and the reaction mass (e.g., the permanent magnet 336c and the mass member 336d) in a manner to damp the movement in the characteristic frequency range (e.g., by oscillating to oppose the direction of movement of the unsprung mass). Such selective force output of the secondary actuator 336 may, for example, be determined and/or controlled by the controller 118.

The combined reaction mass may be approximately 12 kg and have a stroke of approximately 50 mm. The reaction mass may be, for example, approximately 30% of the unsprung mass.

The spring 334, as referenced above, forms a parallel load path with the primary actuator 332 between the vehicle body 110 and the suspension arm 226. For example, as shown, the actuator body 334a of the primary actuator 332 and the housing 336a of the secondary actuator 336 form, respectively, an upper spring seat 334a' and a lower spring seat 336a' against which the spring 334 bears. In one variation of the suspension actuator assembly 230, the spring 334 may be omitted in which case the suspension system 122 may include another spring (e.g., another coil spring or an air spring) at another location (e.g., inboard of the suspension actuator assembly 230), which extends or otherwise transfers force between the unsprung mass (e.g., the suspension arm 226) and the sprung mass (e.g., the vehicle body 110).

In further embodiments discussed below, variations of the suspension actuator assembly 230 include one or more primary actuators that are operated to control primary ride, while mass of the primary actuator is moved to damp movement of the unsprung mass in the characteristic frequency range.

Figure 4A:
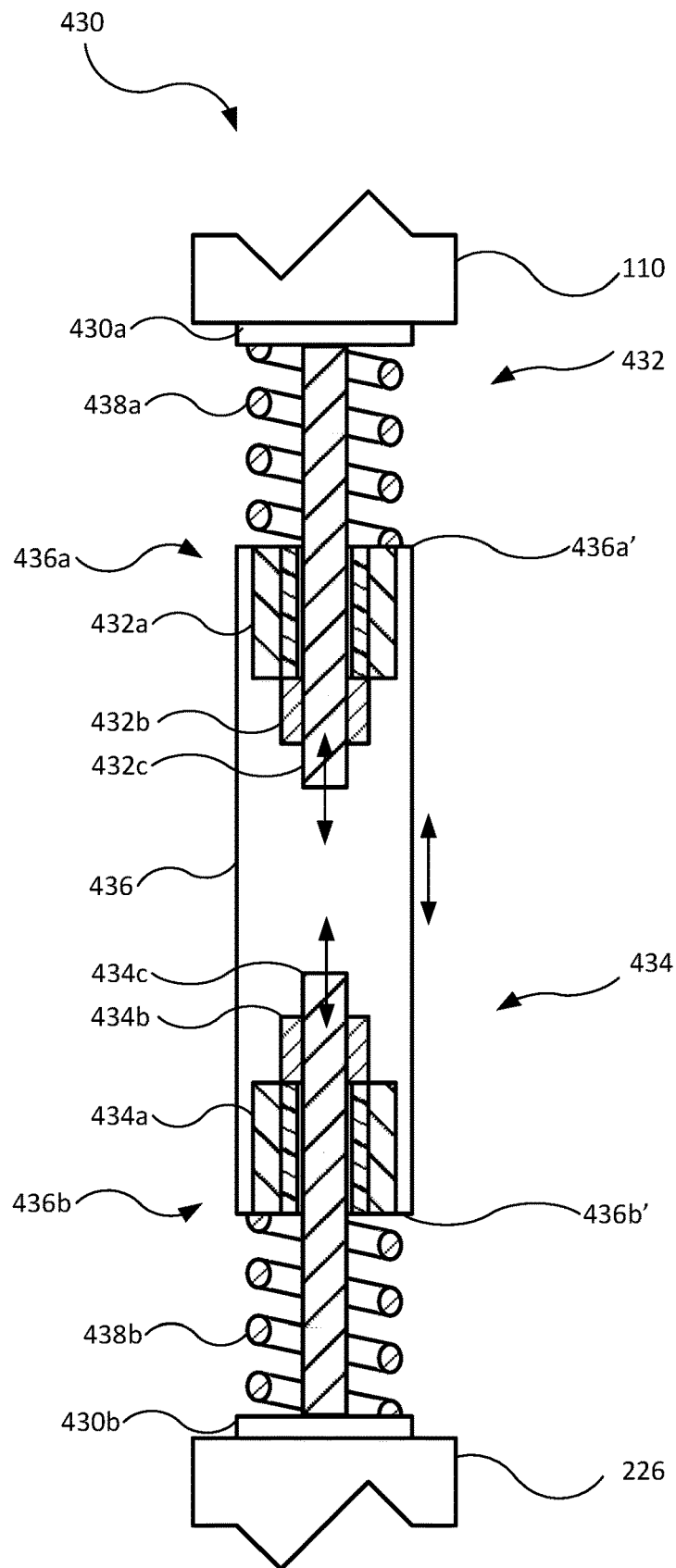
FIG. 4A is a cross-sectional view of another suspension actuator for use in the suspension assembly shown in FIG. 2, the suspension actuator being shown in a first state.
Figure 5A:
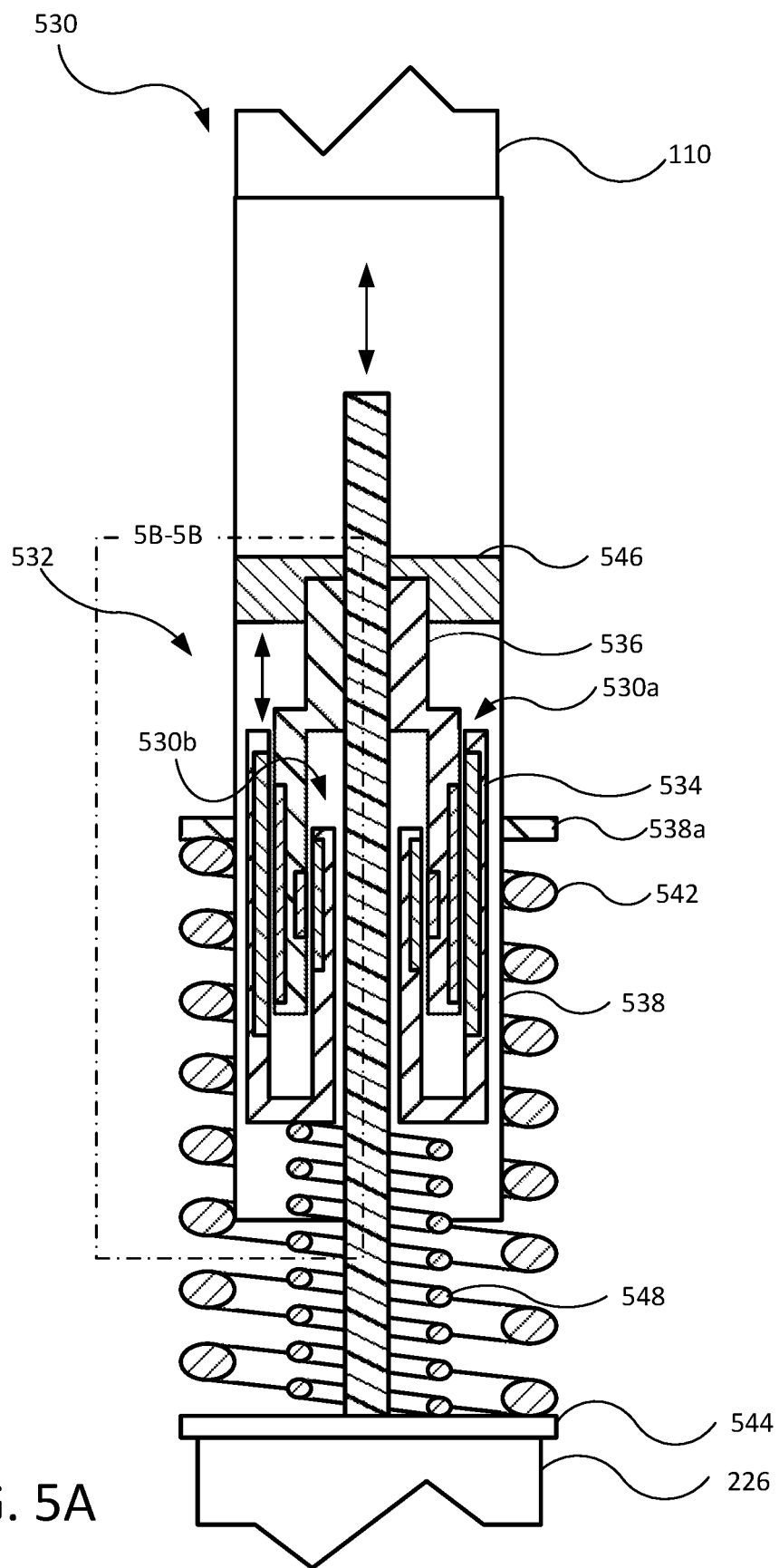
FIG. 5A is a cross-sectional view of another suspension actuator for use in the suspension assembly shown in FIG. 2, the suspension actuator being shown in a first state.
Figure 5B:
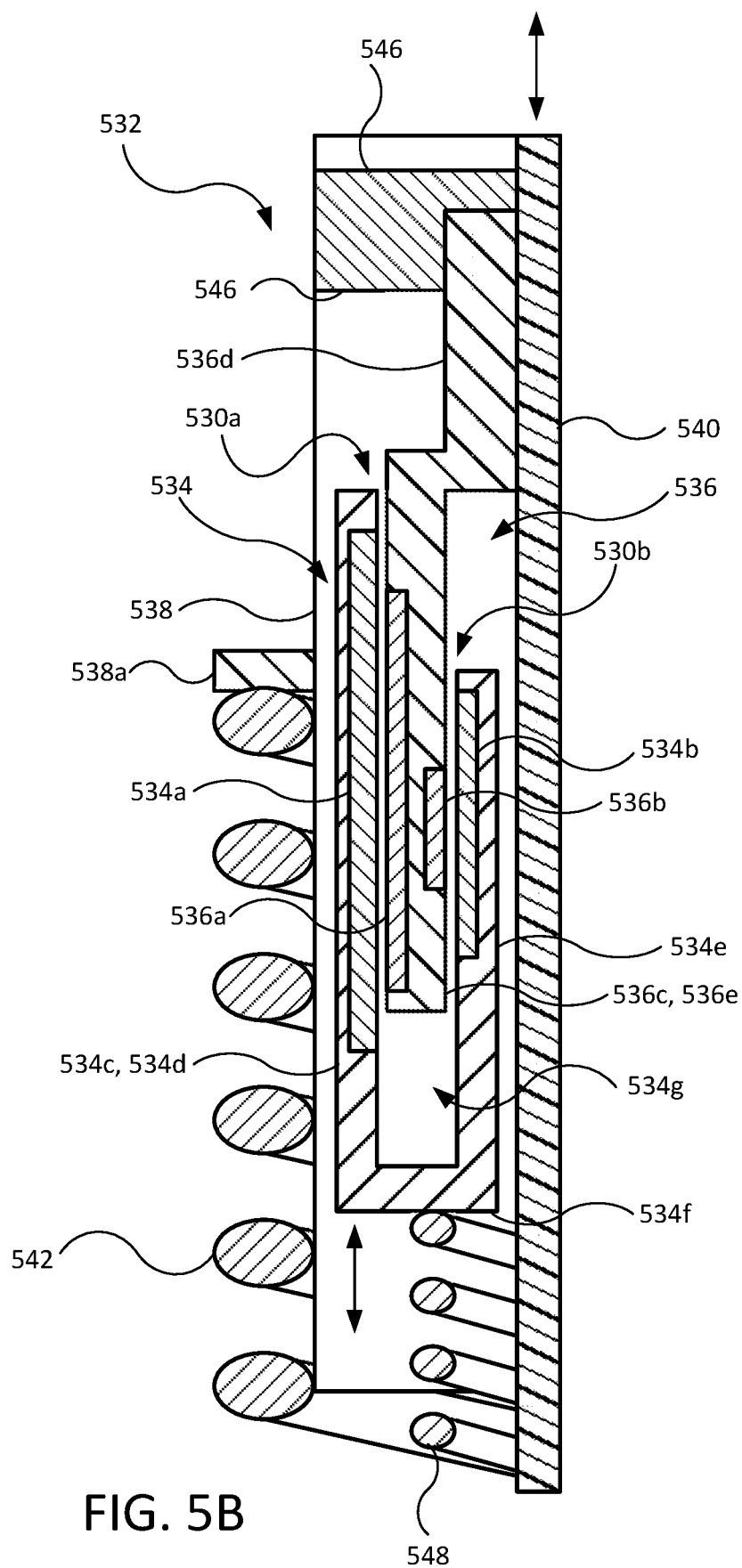
FIG. 5B is a detail cross-sectional view of the suspension actuator of FIG. 5A.
Figures 5C, 5D:
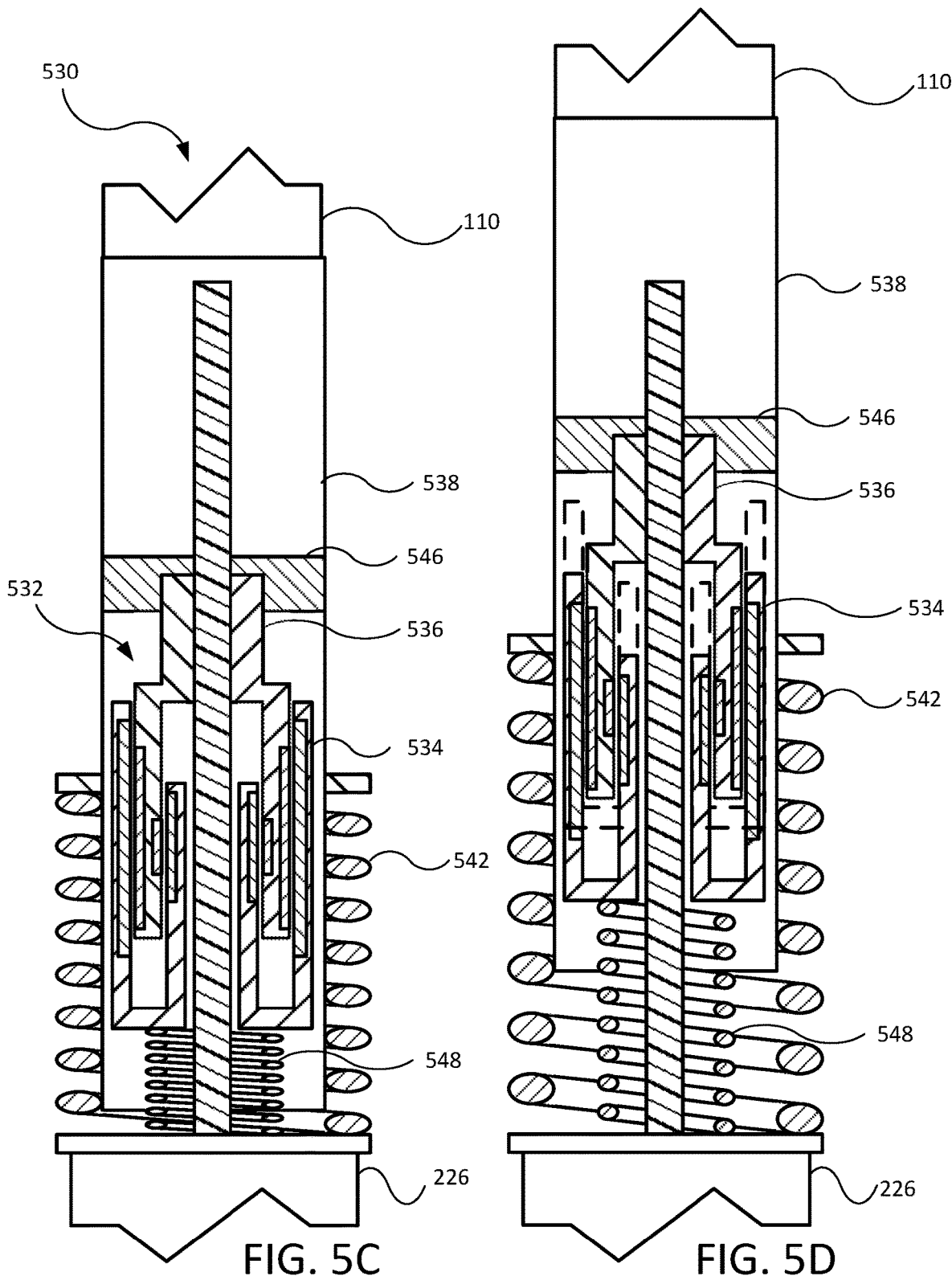
FIG. 5C is a cross-sectional view of the suspension actuator of FIG. 5A shown in a second state.
FIG. 5D is a cross-sectional view of the suspension actuator of FIG. 5A shown in a third state.

Referring to FIGS. 4A-4C, another suspension actuator assembly 430 may be used in the suspension actuator assembly 230 in place of the suspension actuator assembly 230. The suspension actuator assembly 430 generally includes an upper actuator 432 and a lower actuator 434, which are cooperatively configured to control primary ride, while also damping movement of the unsprung mass in the characteristic frequency range by forming and moving a reaction mass. More particularly, the upper actuator 432 and the lower actuator 434 are configured to cooperatively control total displacement between the sprung mass (e.g., the vehicle body 110) and the unsprung mass (e.g., the suspension arm 226) to control movement therebetween in the low frequency range, while the upper actuator 432 and the lower actuator 434 are additionally configured to move relative to the suspension arm 226 such that a reaction mass formed thereby damps the movement of the unsprung mass in the characteristic frequency range. The suspension actuator assembly 430 may be provided as a singular assembly, which may be installed as a singular unit to the vehicle 100, for example, by being coupled by an upper mount 430a and a lower mount 430b thereof to the vehicle body 110 and the suspension arm 226, respectively.

The upper actuator 432 and the lower actuator 434 are in a fixed spatial relationship (e.g., fixed coaxial arrangement) to each other, for example by being connected with an actuator housing 436 (e.g., stator housing) common thereto. The upper actuator 432 and the lower actuator 434 may both be configured as linear actuators, such as the ball screw actuators generally as described above.

The upper actuator 432 generally includes an upper motor 432a, an upper nut 432b, and an upper shaft 432c. The upper motor 432a includes a stator rotationally and axially fixed to an upper end 436a of the actuator housing 436, and also includes a rotor that rotates relative to the stator in a constant axial position. The rotor of the upper motor 432a is fixed to and rotates the upper nut 432b to, thereby, move the upper shaft 432c axially relative thereto.

Similarly, the lower actuator 434 generally includes a lower motor 434a, a lower nut 434b, and a lower shaft 434c. The lower motor 434a includes a stator rotationally and axially fixed to a lower end 436b of the actuator housing 436, and also includes a rotor that rotates relative to the stator in a constant axial position. The rotor of the lower motor 434a is fixed to and rotates the lower nut 434b to, thereby, move the lower shaft 434c relative thereto.

The upper actuator 432 and the lower actuator 434 may be configured to cooperatively have the same or similar effective output as the primary actuator 332 described previously. For example, the upper motor 432a and the lower motor 434a may each have a torque capacity that is approximately half that of the electric motor 332a of the primary actuator 332, while the upper nut 432b, upper shaft 432c, lower nut 434b, and the lower shaft 434c have half the lead (e.g., 25 mm instead of 50 mm) and half the travel (e.g., 70 mm instead of 140 mm) of the nut 332b and the shaft 332c of the primary actuator 332.

An upper end of the upper shaft 432c is coupled to the vehicle body 110, such that operation of the upper actuator 432 moves the upper motor 432a, the upper nut 432b, and the actuator housing 436, along with the lower motor 434a and the lower nut 434b, relative to the vehicle body 110. A lower end of the lower shaft 434c is coupled to the suspension arm 226, such that movement of the lower actuator 434 moves the lower motor 434a, the lower nut 434b, and the actuator housing 436, along with the upper motor 432a and the upper nut 432b, relative to the suspension arm 226.

An upper spring 438a and a lower spring 438b form a load path between the vehicle body 110 and the suspension arm 226, which is parallel to a load path formed by the upper actuator 432 and the lower actuator 434 between the vehicle body 110 and the suspension arm 226. For example, the upper spring 438a may press upward against the upper mount 430a, which is in turn coupled to the vehicle body 110, and downward against an upper spring seat 436a' formed by the actuator housing 436. The lower spring 438b may press downward against the lower mount 430b, which is in turn coupled to the suspension arm 226, and upward against a lower spring seat 436b' formed by the actuator housing 436.

In operation, the upper actuator 432 and the lower actuator 434 of the suspension actuator assembly 430 are cooperatively operated to control movement between the vehicle body 110 and the suspension arm 226 to control primary ride (i.e., movement therebetween in the low frequency range). For example, the upper actuator 432 and the lower actuator 434 may each be operated to selectively apply force to resist or cause movement between the vehicle body 110 and the suspension arm 226 in directions toward and away from each other. This may be referred to as a primary ride control mode. When controlling primary ride, the upper spring 438a and the lower spring 438b transfer load between the vehicle body 110 (i.e., the sprung mass) and the suspension arm 226 (i.e., the unsprung mass) in series.

The upper actuator 432 and the lower actuator 434 are further cooperatively operated to apply force between a reaction mass and the suspension arm 226 (i.e., unsprung mass) to damp movement of the unsprung mass in the characteristic frequency range. This may be referred to as a wheel hop control mode. The reaction mass is cooperatively formed the upper motor 432a, the upper nut 432b, the lower motor 434a, the lower nut 434b, and the actuator housing 436, which are moved (e.g., oscillated) in unison relative to the suspension arm 226 to damp movement thereof in the characteristic frequency range. When damping movement of the unsprung mass in the characteristic frequency range, the upper spring 438a and the lower spring 438b transfer force from the vehicle body 110 and the suspension arm 226, respectively, to the reaction mass in parallel with the upper actuator 432 and the lower actuator 434.

As a further advantage, upon inoperability of the upper actuator 432 or the lower actuator 434 (e.g., failure of one of the motors 432a, 434a thereof) to selectively provide force between the unsprung mass and the sprung mass, the other of the upper actuator 432 or the lower actuator 434 is still operable to selectively apply force between the sprung mass and the unsprung mass to control motion therebetween (e.g., to provide primary ride control in some capacity even if reduced).

The upper spring 438a and the lower spring 438b may have the same spring rate. Alternatively, the lower spring 438b may have a higher spring rate than the upper spring 438a, so as to lessen the force transferred via the upper spring 438a to the vehicle body 110 from movement (e.g., oscillation) of the reaction mass, such that less disturbance is experienced by passengers in the vehicle body 110. Instead or additionally, the upper actuator 432 and the lower actuator 434 may be controlled to offset or damp the oscillating force transferred via the upper spring 438a to the vehicle body 110 when operating in the wheel hop damping mode.

Still further, the upper actuator 432 may not include the upper spring 438a but instead include another spring that transfers force between the vehicle body 110 and the suspension arm 226. For example, the other spring may be compressed between the upper mount 430a and the lower mount 430b. As a result, oscillation forces from moving the reaction mass to damp movement in the characteristic frequency range are not transmitted from the reaction mass via a spring to the vehicle body 110.

For illustration purposes, FIG. 4B shows the suspension actuator assembly 430 in a compressed state with a lesser distance between the vehicle body 110 and the suspension arm 226 as compared to FIG. 4A, which reflects operation of the upper actuator 432 and the lower actuator 434 in the primary ride control mode, thereby functioning as a primary actuator. FIG. 4C illustrates the suspension actuator assembly 430 having the same distance between the vehicle body 110 and the suspension arm 226 as compared to FIG. 4A, but with the combined mass being biased toward the suspension arm 226. This reflects operation of the upper actuator 432 and the lower actuator 434 in the wheel hop control mode, thereby functioning as a reaction mass actuator to damp movement of the unsprung mass in the characteristic frequency range.

Referring to FIGS. 5A-5D, another suspension actuator assembly 530 may be used in the suspension actuator assembly 230. The suspension actuator assembly 530 generally includes a stator assembly 534, a rotor assembly 536 (e.g., rotor-nut assembly), a housing 538, a shaft 540, and a primary spring 542. The suspension actuator assembly 530 is configured to function as both a primary actuator, which transfers loading between the sprung mass and the unsprung mass for damping low frequency movement therebetween, and a reaction mass actuator, which applies forces between the unsprung mass and a reaction mass formed by a functional component of the primary actuator (e.g., the stator assembly 534). The suspension actuator assembly 530 may be provided as a singular assembly, which may be installed as a singular unit to the vehicle 100, for example, by being coupled by the housing 538 (or a mount thereof) and a lower mount 544 thereof to the vehicle body 110 and the suspension arm 226, respectively.

The stator assembly 534 and the rotor assembly 536 cooperatively form an electric motor 530a, which operates the primary actuator in the form of a ball screw actuator for primary ride control, and also form an electromagnetic linear actuator 530b, which operates the reaction mass actuator for damping movement of the unsprung mass in the characteristic frequency range. The stator assembly 534 and the rotor assembly 536, thus, may be arranged such that the electric motor 530a and the electromagnetic linear actuator 530b are arranged generally concentrically, which may allow for a lesser axial length than if the primary actuator and the reaction mass actuator were instead arranged axially adjacent to each other. The stator assembly 534 is rotatably fixed and axially movable relative to the housing 538, for example, via a sliding splined connection. The rotor assembly 536 is axially fixed and rotatable relative to the housing 538. The electric motor 530a may also be referred to as a primary actuator mechanism, while the electromagnetic linear actuator 530b may also be referred to as a secondary actuator mechanism.

The primary spring 542 forms a parallel load path to the actuator 532 between the vehicle body 110 and the suspension arm 226. For example, the primary spring 542 may generally surround the housing 538 and press upward against a circumferential spring seat 538a thereof, while also pressing downward against a lower mount 544. The lower mount 544 is in turn connected to the suspension arm 226.

The stator assembly 534 generally includes an outer winding 534a, an inner winding 534b, and an annular member 534c. The outer winding 534a forms the stator of an electric motor 530a, while the inner winding 534b forms the coil of the electromagnetic linear actuator 530b. The annular member 534c is rotatably fixed and axially movable relative to the housing 538 and the shaft 540 and has coupled thereto the outer winding 534a and the inner winding 534b. This allows transfer of torque from the housing 538 and/or the shaft 540 to the rotor assembly 536 to operate the ball screw portion of the suspension actuator assembly 530 for primary ride control, while being movable axially damp movement of the unsprung mass in the characteristic frequency range.

The annular member 534c generally includes an outer circumferential wall 534d, an inner circumferential wall 534e, and a radial wall 534f extending radially therebetween. The outer circumferential wall 534d and the inner circumferential wall 534e are generally cylindrical and concentric with each other and the shaft 540, and define a cavity 534g therebetween. The outer winding 534a is coupled to an inner surface of the outer circumferential wall 534d and the inner winding 534b is coupled to an outer surface of the inner circumferential wall 534e, so as to face each other and into the cavity 534g therebetween. An outer surface of the outer circumferential wall 534d forms the rotatably fixed and axially movable connection with the housing 538 (e.g., via a sliding splined connection, such as with a ball spline). An inner surface of the inner circumferential wall may also form another rotatably fixed and axially movable connection with the shaft 540 (e.g., via another sliding splined connection, such as with a ball spline). As a result, the annular member 534c and, thereby, the stator assembly 534 is rotatable fixed relative to the housing 538 and the shaft 540, while being movable axially relative thereto.

The rotor assembly 536 generally includes an outer magnet 536a, an inner magnet 536b, an annular member 536c, and a nut portion 536d (e.g., ball nut or ball nut portion). The outer magnet 536a, along with the outer winding 534a of the stator assembly 534, cooperatively form the electric motor 530a for applying torque to the nut portion 536d for controlling movement between the vehicle body 110 and the suspension arm 226 for primary ride control (compare FIG. 5C to FIG. 5A). The inner magnet 536b, along with the inner winding 534b of the stator assembly 534, cooperatively form the electromagnetic linear actuator, which moves the stator assembly 534 axially as a reaction mass to damp movement of the unsprung mass in the characteristic frequency range (compare FIG. 5D to FIG. 5A).

The annular member 536c forms a circumferential wall 536e and the nut portion 536d. The annular member 536c is rotatable and axially fixed relative to the housing 538, for example, with a bearing 546 (depicted schematically). The nut portion 536d is configured as a ball nut of a ball screw actuator, and as torque is applied to the nut portion 536d as part of the rotor assembly 536, the nut portion 536d engages the shaft 540 to cause or prevent relative movement therebetween. The nut portion 536d may be formed integrally with the annular member 536c (as shown) or may be formed separately and coupled thereto.

The annular member 536c forms a circumferential wall 536e that is received in the cavity 534g between the outer circumferential wall 534d and the inner circumferential wall 534e of the annular member 534c of the stator assembly 534. The outer magnet 536a (e.g., formed by one or more permanent magnets) is coupled to an outer surface of the circumferential wall 536e, so as to be arranged within a magnetic field produced by the outer winding 534a of the rotor assembly 536. The outer winding 534a and the outer magnet 536a, thereby, cooperatively form the electric motor 530a, which rotates the rotor assembly 536, including the nut portion 536d, relative to the housing 538 and the shaft 540. The inner magnet 536b (e.g., formed by one or more permanent magnets) is coupled to an inner surface of the circumferential wall 536e, so as to be arranged within another magnetic field produced by the inner winding 534b of the rotor assembly 536. The inner winding 534b and the inner magnet 536b, thereby, cooperatively form the electromagnetic linear actuator 530b (e.g., voice coil), which moves the stator assembly 534 axially within the cavity 534g of the rotor assembly 536.

The stator assembly 534 is further supported by a secondary spring 548, which presses upward against a lower portion of the annular member 534c and downward against the lower mount 544, which forms a spring seat against which the primary spring 542 additionally bears. The secondary spring 548, the reaction mass formed by the stator assembly 534, and the electromagnetic linear actuator 530b (e.g., formed by the inner winding 534b and the inner magnet 536b) cooperatively form a reaction mass actuator, which may be tuned according to the natural frequency of the unsprung mass.

Axial lengths (e.g., axial winding lengths) of the outer winding 534a and the inner winding 534b are greater than axial lengths (e.g., axial magnet lengths) of the outer magnet 536a and the inner magnet 536b, respectively. This allows outer magnet 536a and the inner magnet 536b to remain in the magnetic fields, respectively, produced by the outer winding 534a and the inner winding 534b as the stator assembly 534 is moved axially by the electromagnetic linear actuator 530b to damp movement of the unsprung mass occurring at the characteristic frequency thereof. This allows continued operation of the electric motor 530a for operating the ball screw actuator for primary ride control and of the electromagnetic linear actuator 530b for linear force output for damping movement of the unsprung mass in the characteristic frequency range. The outer winding 534a and the inner winding 534b may, for example, have axial lengths that are greater than axial lengths of the outer magnet 536a and the inner magnet 536b, respectively, by distances equal to or greater than a stroke (e.g., axial movement) that the stator assembly 534, as the reaction mass, is movable relative to the rotor assembly 536.

Figure 6:
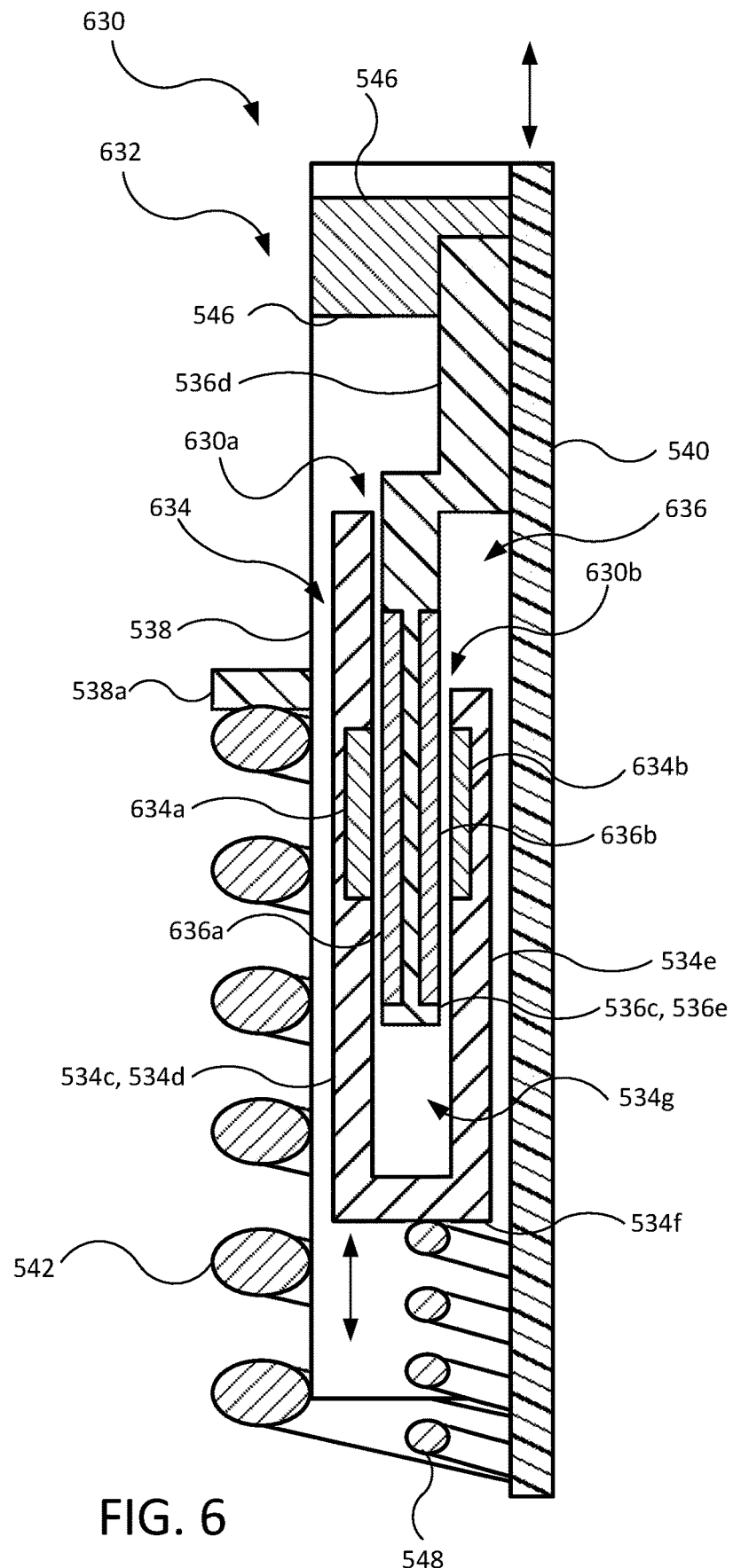
FIG. 6 is a detail cross-sectional view of another suspension actuator for use in the suspension assembly shown in FIG. 2, which is taken as a similar detail to FIG. 5B from FIG. 5A.

Referring to FIG. 6, a suspension actuator assembly 630 is configured as a variation of the suspension actuator assembly 530. Common elements of the suspension actuator assembly 630 are referred to with common reference numerals of the suspension actuator assembly 530 in the figures and are not discussed in further detail below. The suspension actuator assembly 630 includes an actuator 632 that forms an electric motor 630a and an electromagnetic linear actuator 630b (e.g., voice coil). The actuator 632 includes a stator assembly 634 and a rotor assembly 636. The stator assembly 634 includes an outer winding 634a and an inner winding 634b connected to an annular member 534c that is configured as described previously. The rotor assembly 636 includes an outer magnet 636a and an inner magnet 636b connected to an annular member 536c and a nut portion 536d that are configured as described previously. The electric motor 630a may also be referred to as a primary actuator mechanism, while the electromagnetic linear actuator 630b may also be referred to as a secondary actuator mechanism.

Axial magnet lengths of the outer magnet 636a and the inner magnet 636b of the rotor assembly 636 are greater than axial winding lengths of the outer winding 634a and the inner winding 634b, respectively, of the stator assembly 634. These relative axial lengths allow the outer magnet 636a and the inner magnet 636b of the rotor assembly 636 to remain within the magnetic fields produced by the other winding 634a and the inner winding 634b, respectively, of the stator assembly 634 as the stator assembly 634 moves axially to maintain torque for primary ride control and linear force output for damping movement of the unsprung mass in the characteristic frequency range. Each of the axial magnet lengths may, for example, be greater than the axial winding lengths by a distance equal to or greater than a stroke distance of the stator assembly 634 (i.e., the distance that the stator assembly 634 may move relative to the rotor assembly 636 when damping movement of the unsprung mass occurring at the characteristic frequency).

Comparing the electric motor 530a and the electric motor 630a with common output capacities (e.g., torque capacities) and mass, the electric motor 630a has efficiency advantages but lesser mass advantages. More particularly, by having magnet lengths that are greater than the axial winding lengths, the electric motor 630a may operate more efficiently as compared to the electric motor 530a by not producing excess magnetic fields with the outer winding 634a and the inner winding 634b by not extending axially beyond the outer magnet 636a and the inner magnet 636b. However, with the outer magnet 636a and the inner magnet 636b being longer (i.e., larger) those of the electric motor 530a, the rotor assembly 636 has a greater moment of rotational inertia that may result in lower responsiveness. Further by having the outer winding 634a and the inner winding 634b axially shorter, the stator assembly 634 may form a lower reaction mass than the stator assembly 534 and, thereby, provide less capacity for damping movement of the unsprung mass in the characteristic frequency range.

Figure 7:
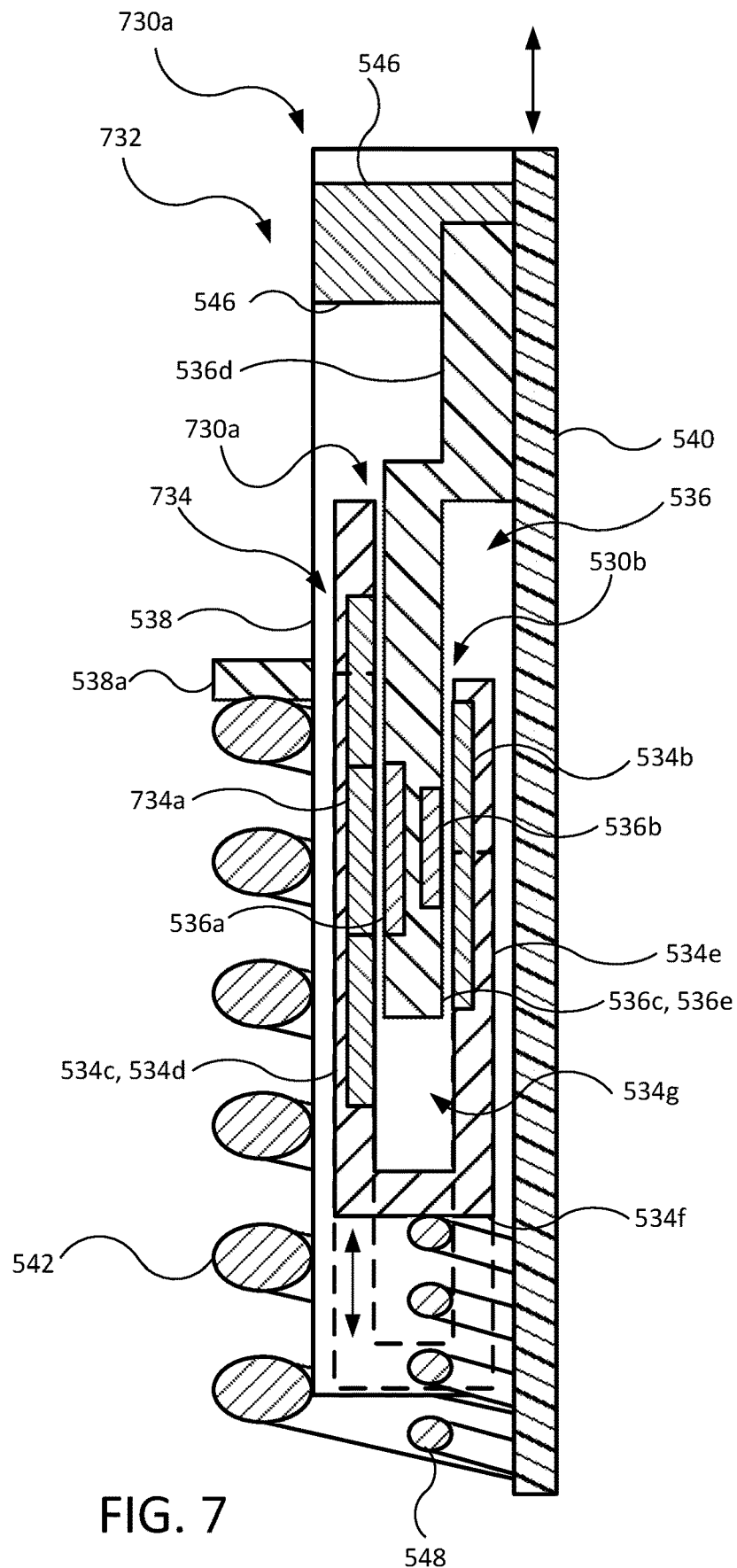
FIG. 7 is a detail cross-sectional view of another suspension actuator for use in the suspension assembly shown in FIG. 2, which is taken as a similar detail to FIG. 5B from FIG. 5A.

Referring to FIG. 7, a suspension actuator assembly 730 is configured as a variation of the suspension actuator assembly 530. Common elements of the suspension actuator assembly 730 are referred to with common reference numerals of the suspension actuator assembly 530 in the figures and are not discussed in further detail below. The suspension actuator assembly 730 includes an actuator 732 that forms an electric motor 730a and the electromagnetic linear actuator 530b (described previously). A stator assembly 734 includes a series of outer windings 734a (e.g., three), the inner winding 534b, and the annular member 534c. The outer windings 734a are positioned axially adjacent to each other and have a cooperative axial winding length that is greater than the axial magnet length of the outer magnet 536a of the rotor assembly 536. Each one of the outer windings 734a may have an axial winding length that is approximately equal to the axial magnet length of the outer magnet 536a.

During operation, as the stator assembly 734 moves axially relative to the rotor assembly 536, the outer windings 734a are configured to selectively produce magnetic fields that the outer magnet 536a stay within. For example, with the stator assembly 734 in a middle position, the outer magnet 536a is aligned with (e.g., at a common elevation with) a middle one of the outer windings 734a. The middle one of the outer windings 734a is powered to generate the magnetic field in which the outer magnet 536a is positioned, while upper and lower ones of the outer windings 734a are powered off, so as to not generate the magnetic field. Similarly, when the stator assembly 734 is in a lowered position (outline shown in dashed lines), the outer magnet 536a is aligned with the upper one of the outer windings 734a, which is powered to generate the magnetic field, while the middle and lower ones of the outer windings 734a are powered off, so as to not generate the magnetic field. When the stator assembly 734 is in a raised position (not shown), the outer magnet 536a is aligned with the lower one of the outer windings 734a, which is powered to generate the magnetic field, while the middle and upper ones of the outer windings 734a are powered off, so as to not generate the magnetic field.

As the stator assembly 734 and the outer windings 734a move into and out of alignment with the outer magnet 536a, one or two of the outer windings 734a may be powered to provide the magnetic field. For example, when relatively low torque is required from the electric motor 730a (e.g., for damping low frequency movement from relatively low magnitude forces), only one of the outer windings 734a may be powered, such that axial misalignment of the magnetic field of the powered winding 734a may still provide adequate torque output. When high torque is required from the electric motor 730a (e.g., for damping low frequency movement from relatively high magnitude forces), two of the outer windings 734a may be powered, such that the magnetic fields produced by the two of the outer windings 734a axially overlap the outer magnet 536a entirely.

Comparing the actuator 732 to the actuator 532, the actuator 732 may operate more efficiently by selectively powering the outer windings 734a, such that excess magnetic field produced thereby may be lessened, but requires more complex controls and/or circuitry for selectively operating the outer windings 734a. Comparing the actuator 732 to the actuator 632, the actuator 732 reduces the moment of inertia of the rotor assembly 536, which may improve responsiveness of the electric motor 730a, while also increasing the reaction mass formed by the stator assembly 734, which may better damp movement of the unsprung mass at the characteristic frequency.

For each of the actuators 532, 632, and 732 described previously, the arrangement of the electric motors 530a, 630a, 730a being radially outward of the electromagnetic linear actuators 530b, 630b, 530b, respectively, may be switched. For example, directions of the magnetic field produced by the respective outer windings 534a, 634a, 734a and the respective inner windings 534b, 634b, 534b, respectively, may be switched therebetween, such that the electromagnetic linear actuator and the linear force produced thereby are positioned radially outward of the electric motor and the torque produced thereby.

Figure 8:
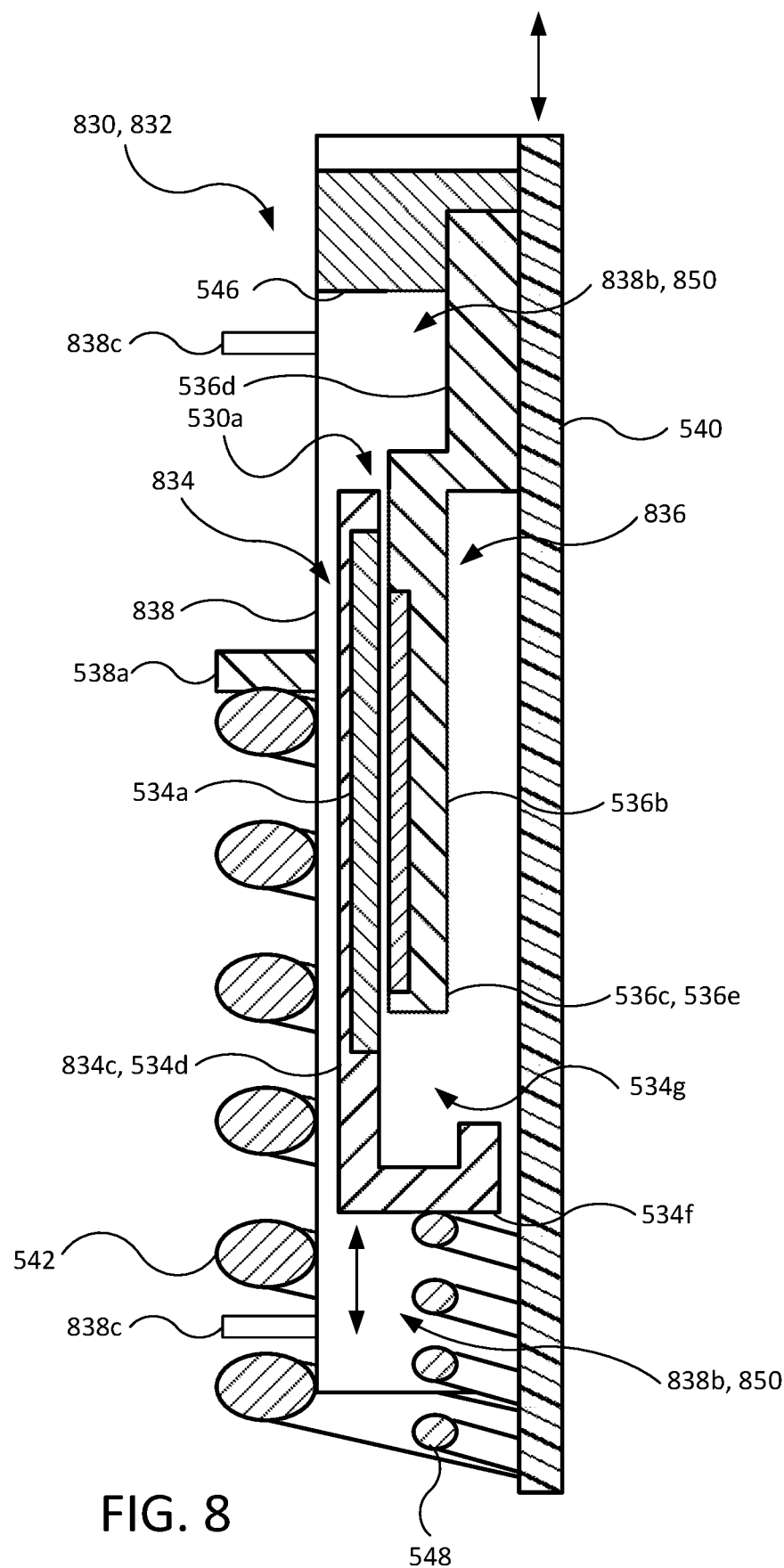
FIG. 8 is a detail cross-sectional view of another suspension actuator for use in the suspension assembly shown in FIG. 2, which is taken as a similar detail to FIG. 5B from FIG. 5A.

Referring to FIG. 8, a suspension actuator assembly 830 is configured as a variation of the suspension actuator assembly 530. Rather than incorporating the electromagnetic linear actuator 530b for providing the damping function as a reaction mass actuator, the suspension actuator assembly 830 instead incorporates a tuned mass damper of which a stator assembly 834 functions as the moving mass. Common elements of the actuator 832 are referred to with common reference numerals in the figures and are not discussed below.

The suspension actuator assembly 830 includes an actuator 832 having the stator assembly 834 and a rotor assembly 836, along with a housing 838, the shaft 540, the primary spring 542, the bearing 546, and the secondary spring 548. The stator assembly 834 may be configured similar to the stator assembly 534, but omits the inner winding 534b and may also omit at least a portion of the inner circumferential wall 534e of the annular members 534c. The rotor assembly 836 may be configured similar to the rotor assembly 536 but omits the inner magnet 536b.

The housing 838, the stator assembly 834, and the secondary spring 548 cooperatively form tuned mass damper, which is tuned according to the natural frequency of the unsprung mass. More particularly, the housing 838 defines a chamber 838b, which contains a damping fluid 850. As the unsprung mass, which includes the suspension arm 226 moves, the stator assembly 834 moves within the chamber 838b as the damping fluid 850 resists movement thereof. That is, the stator assembly 834 functions similar to a piston of a conventional fluid damper. The damper functionality may be tuned, for example, by a spring constant of the secondary spring 548 and/or fluid passing to different axial sides of the stator assembly 834 (e.g., around sides thereof and/or through one or more orifices of tunable size).

As is shown, the damping fluid 850 may flow into and out of the housing 838, for example, through ports 838c. The ports 838c may be tuned to provide desired damping characteristics as the damping fluid 850 flows into and out of the housing 838 therethrough. Still further, the damping fluid 850 may be a cooling liquid, which may be pumped into and out of the housing 838 to cool the stator assembly 834. Alternatively, the damping fluid 850 may stay contained entirely within the chamber 838b defined by the housing 838 in which case the ports 838c are omitted.

A further variation of the actuator 832 may include an electric motor configured as the electric motor 630a described previously by having multiple outer windings (e.g., winding sections).

Figure 9:
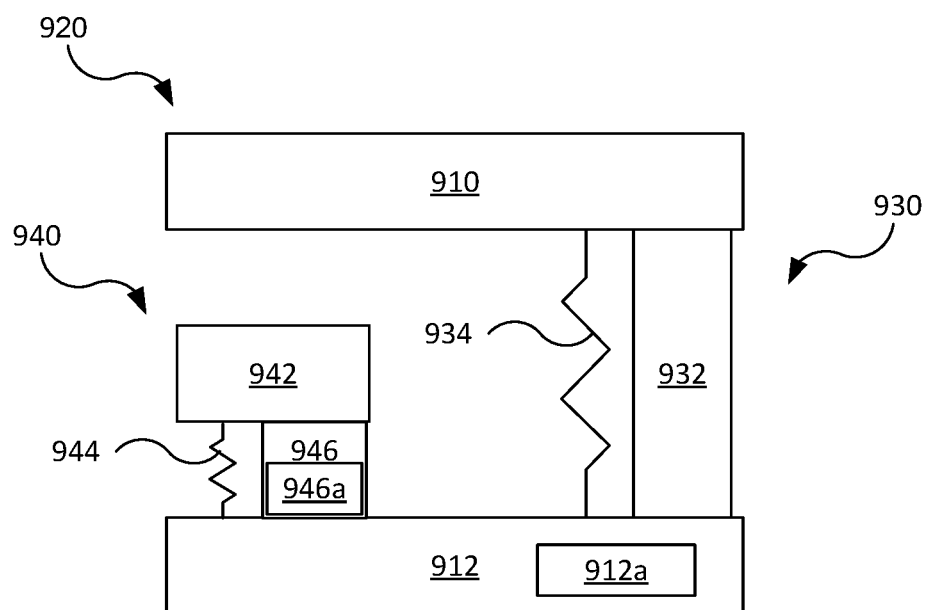
FIG. 9 is a schematic view of a suspension actuator for use in the suspension assembly shown in FIG. 2.
Figure 10:
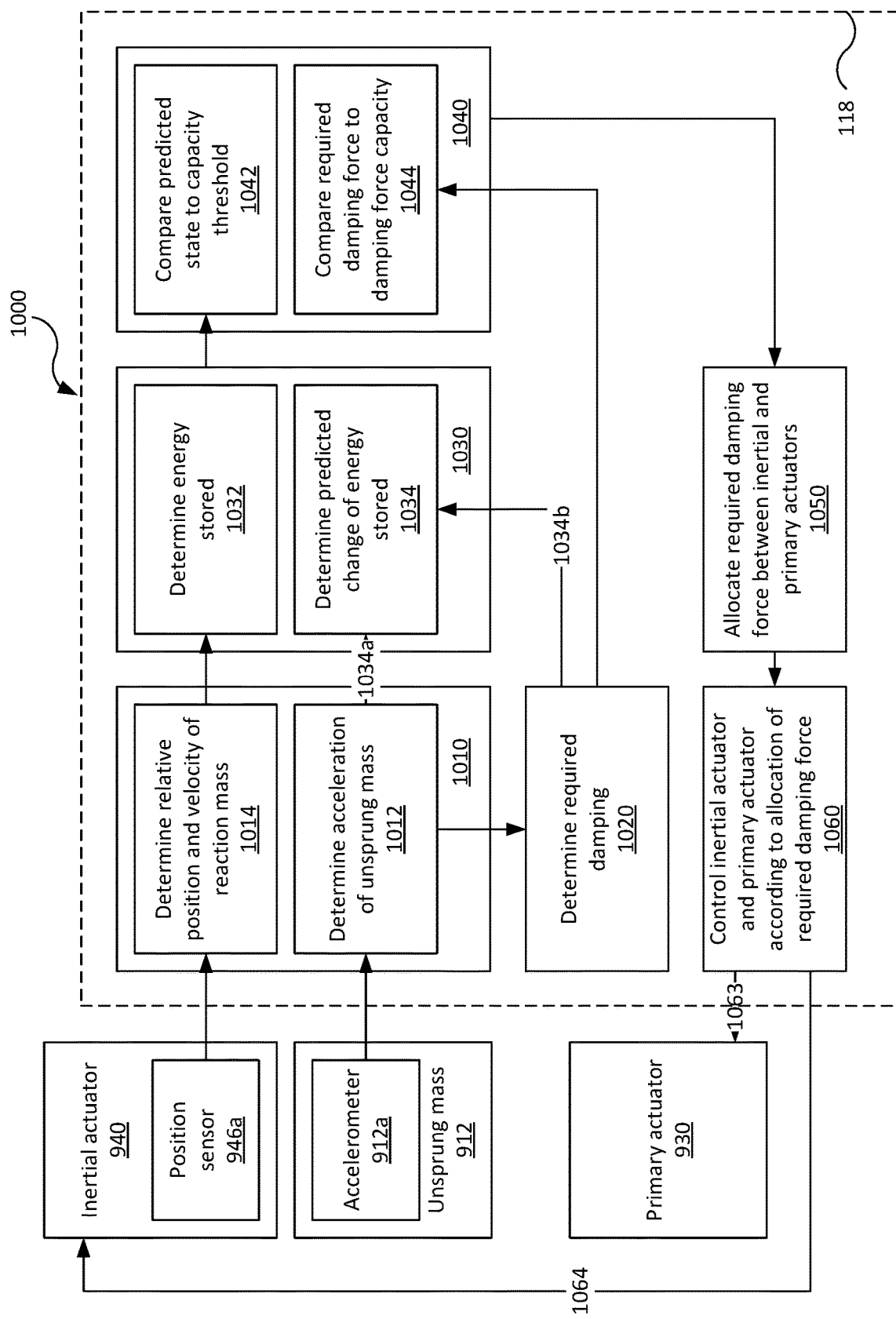
FIG. 10 is a schematic view of a control system for use with the suspension assembly of FIG. 2.

Referring to FIGS. 9-10, a control system and methodology are provided for allocating damping of movement in the characteristic frequency range between a primary actuator and an inertial actuator. Broadly speaking, the control methodology includes comparing a predicted state of the inertial actuator to a capacity threshold of the inertial actuator, and cooperatively performing the damping with the inertial actuator and the primary actuator if the predicted state exceeds the capacity threshold.

FIG. 9 is a schematic representing a suspension system 920, which includes both a primary actuator 930 and an inertial actuator 940. The primary actuator 930 and the inertial actuator 940 may be provided by any of the suspension actuator assemblies 230, 530, 630, 730, 830 described previously, or other suitable arrangement (e.g., the inertial actuator 940 being a separate device from the primary actuator 930). The inertial actuator 940 is coupled to an unsprung mass 912 (e.g., the tire and wheel assembly 124, the suspension arm 226, the steering knuckle 228, etc.) and functions as a reaction mass actuator to damp high frequency movement of the unsprung mass 912 (e.g., wheel hop). The inertial actuator 940 is the main actuator by which the movement of the unsprung mass 912 at the characteristic frequency is damped.

The primary actuator 930 selectively applies force between a sprung mass 910 (e.g., the vehicle body 110) and the unsprung mass 912, so as to control primary ride (e.g., roll, pitch, yaw), while also damping low frequency movement. The primary actuator 930 is additionally configured to supplement the inertial actuator 940 to damp movement at the characteristic frequency by transferring such movement to the sprung mass 910, so as to maintain contact with the road surface during higher magnitude, high frequency movement (e.g., to provide supplemental wheel hop control). With the primary actuator 930 being capable of damping such high frequency movement, the inertial actuator 940 may be sized smaller (e.g., with reaction mass, motor output, and stroke), while the suspension system 920 is still capable of damping movement at the characteristic frequency, even at higher magnitudes, movement to maintain contact with the road surface for traction purposes.

As shown schematically in FIG. 9, the primary actuator 930 generally includes a primary actuator mechanism 932 and a spring 934, which form parallel load paths between the sprung mass 910 and the unsprung mass 912. The primary actuator mechanism 932 is a linear actuator, such as a ball screw actuator of one of the suspension actuator assemblies described previously.

The inertial actuator 940 generally includes a reaction mass 942, a spring 944, and a secondary actuator mechanism 946 that is a linear actuator. The secondary actuator mechanism 946 may be an electromagnetic linear actuator, such as those in the suspension actuator assemblies 230, 630, and 730, or may be a ball screw actuator, such as that in the suspension actuator assembly 530. As referenced above, the inertial actuator 940 damps movement in the characteristic frequency range of the unsprung mass 912 by selectively applying a reaction force between the reaction mass 942 and the unsprung mass 912. The reaction force is applied to the unsprung mass 912 in an opposite direction to movement of the unsprung mass 912 at a corresponding frequency. For example, as the unsprung mass 912 moves upward from engaging a road disturbance and downward thereafter, the reaction force may be applied to the unsprung mass 912 downward and upward, respectively. By applying the reaction force between the unsprung mass 912 and the reaction mass 942, kinetic energy of the unsprung mass 912 is converted into mechanical energy stored by the inertial actuator 940 and electrical energy dissipated by the inertial actuator 940. More particularly, as force is transferred by the secondary actuator mechanism 946 from the unsprung mass 912 to the reaction mass 942, the reaction mass 942 is moved relative thereto to store the kinetic energy, the spring 944 is displaced to store the potential energy, and the secondary actuator mechanism 946 is moved to generate electrical energy that may be stored in an electrical storage component (e.g., a battery; not shown).

Capacity of the inertial actuator 940 to damp movement of the unsprung mass 912 may be limited by a stroke distance $D_{stroke}$ of the reaction mass 942, an energy storage capacity, and/or an output force. Required damping in the characteristic frequency range (e.g., at the natural frequency) to prevent resonance (e.g., to maintain contact between the road surface and the tire) may exceed the capacity of the inertial actuator 940.

For example, the capacity of the inertial actuator 940 may result from the mass $M_R$ and the stroke distance $D_{stroke}$ of the reaction mass 942, as well as the stiffness of the spring 944. For lower magnitude movement of the unsprung mass 912 at the characteristic frequency, lower magnitude displacement of the reaction mass 942 is required to apply the reaction force to the unsprung mass 912 for transferring kinetic energy between the unsprung mass and the reaction mass 942 (e.g., for short movements of the unsprung mass 912, the reaction mass 942 is moved by the secondary actuator mechanism 946 a small distance). For higher magnitude displacement of the unsprung mass 912 at the characteristic frequency, higher magnitude displacement of the reaction mass 942 is required to convert the kinetic energy between the unsprung mass 912 and the reaction mass 942 (e.g., for longer movements of the unsprung mass 912, the reaction mass 942 is moved by the secondary actuator mechanism 946 longer distances). The stroke distance $D_{stroke}$ of the reaction mass 942, however, limits the magnitude of magnitude of displacement of the reaction mass 942 and, thereby, limits the amount of kinetic energy that may be transferred thereto from the unsprung mass 912. Thus, the stroke distance $D_{stroke}$ limits the capacity of the inertial actuator 940 to damp movement of the unsprung mass 912.

Capacity of the inertial actuator 940 may also be limited by an energy storage capacity of the inertial actuator 940, which is the amount of energy that may be stored mechanically (i.e., as kinetic energy and potential energy) by the inertial actuator 940. The energy storage capacity $E_{capacity}$ of the inertial actuator 940 is generally equal to a maximum amount of potential energy $E_{Pcapacity}$, which may be stored by the spring 944. Thus, the total energy storage capacity $E_{capacity}$ is a product of the spring constant K and the stroke distance $D_{stroke}$ of the reaction mass 942, where $E_{capacity} = E_{Pcapacity} = \frac{1}{2} \times K \times D_{stroke}^2$.

Capacity of the inertial actuator 940 may also be limited by an output force capacity $F_{capacity}$, which is the maximum force the inertial actuator 940 may apply to the unsprung mass 912. The output force capacity $F_{capacity}$ of the inertial actuator 940 is generally limited by the force that the secondary actuator mechanism 946 is able to apply to the reaction mass 942 to accelerate the reaction mass 942. When damping the movements of the unsprung mass 912 requires output force $F_{required}$ below the output force capacity $F_{capacity}$, the secondary actuator mechanism 946 is capable of transferring such force between the reaction mass 942 and the unsprung mass 912. For example, the secondary actuator mechanism 946 may resist relative motion of the reaction mass 942 and the unsprung mass 912 dissipating energy (e.g., by converting kinetic energy to electrical energy), and may assist relative motion of the reaction mass 942 and the unsprung mass 912 (e.g., by converting electrical energy to kinetic energy). However, when required damping requires output force $F_{required}$ above the output force capacity $F_{capacity}$, the secondary actuator mechanism 946 may be unable to transfer sufficient force between the unsprung mass 912 and the reaction mass 942 to provide required damping to maintain contact with the road surface.

The output force capacity $F_{capacity}$ of the inertial actuator 940 may be a fixed value. Alternatively, the output force capacity $F_{capacity}$ may vary depending on a state of the inertial actuator 940. As noted above, the output force of the inertial actuator 940 to the unsprung mass 912 requires accelerating the reaction mass 942 relative to the unsprung mass 912, which the spring 944 also applies force between. Thus, to accelerate the reaction mass 942, the secondary actuator mechanism 946 must also displace the spring 944. As a result, the output force from the secondary actuator mechanism 946 may differ from the overall damping force required $F_{required}$ to be output by the inertial actuator 940 as a unit based on displacement of the spring 944, for example, being greater if overcoming the spring 944 or lesser if assisted by the spring 944.

Capacity of the inertial actuator 940 may be limited in other circumstances upon reduced operability or inoperability of the secondary actuator mechanism 946, such as in transient condition (e.g., high temperature of the secondary actuator mechanism 946, which may reduce capacity) or permanent conditions (e.g., failure, which reduce capacity to zero).

When the capacity of the inertial actuator 940, as limited by the stroke distance $D_{stroke}$, the energy storage capacity $E_{capacity}$, and/or the output force capacity $F_{capacity}$, is predicted to be exceeded if the required damping were provided only by the inertial actuator 940, the primary actuator 930 may be utilized provide additional damping to maintain contact with the road surface. Otherwise, the reaction mass 942 may travel the entire stroke distance $D_{stroke}$ (e.g., engaging end stops of the inertial actuator 940) and/or exceed the force capacity $F_{capacity}$, which may result in reduced contact with the road surface (i.e., wheel hop occurs). Instead or additionally, when the capacity of the inertial actuator 940 is reduced due to reduced operability or inoperability, the primary actuator 930 may be utilized to provide further additional damping and/or provide all damping at the characteristic frequency.

Referring to FIG. 10, a control system 1000 is provided for allocating damping of high frequency movement between the primary actuator 930 and the inertial actuator 940. Generally speaking, when a capacity threshold of the inertial actuator 940 is predicted to be exceeded if all required damping were to be performed by the inertial actuator 940, the control system 1000 causes the primary actuator 930 to perform damping of the movement of the unsprung mass in the characteristic frequency range to supplement damping performed by the inertial actuator 940. That is, the required damping in the characteristic frequency range is provided cooperatively by the primary actuator 930 and the inertial actuator 940. The control system 1000 may be considered to include the accelerometer 912a and the position sensor 946a. The control system 1000 may include various units, which include software programming, that may be implemented or executed by the controller 118 as described in further detail below with reference to FIG. 11.

In a first unit 1010, conditions of the unsprung mass 912 and the inertial actuator 940 are monitored. More particularly, in a first subunit 1012 acceleration of the unsprung mass is determined (e.g., vertical acceleration). For example, referring to FIG. 9, an accelerometer 912a is coupled to the unsprung mass 912 (e.g., to the steering knuckle 228) and measures acceleration $A_{unsprung}$ of the unsprung mass 912 in a generally vertical direction. In a second subunit 1014, a relative position $D_{reactionmass}$ and a velocity $V_{reactionmass}$ of the reaction mass 942 are determined. For example, the secondary actuator mechanism 946 may include a position sensor 946a (e.g., linear encoder) from which the relative position $D_{reactionmass}$ of the reaction mass 942 is determined (e.g., relative to the unsprung mass 912). The velocity $V_{reactionmass}$ of the reaction mass 942 may be determined by comparing the relative position $D_{reactionmass}$ of the reaction mass 942 at successive times, as determined with the position sensor 946a.

In a second unit 1020, a required damping is determined. The required damping is an amount of damping required to damp movement in the characteristic frequency range (e.g., at the natural frequency) to prevent or hinder resonance of the unsprung mass 912 (e.g., to maintain contact with the road surface). The required damping may be the damping force $F_{required}$ required to be applied to the unsprung mass 912 by the inertial actuator 940. The required damping force $F_{required}$ is determined, for example, according to the acceleration $A_{unsprung}$ of the unsprung mass 912, as determined in the first unit 1010. For example, the required damping may be sufficient to generate an equal and opposite moment about the pivot axis of the unsprung mass 912 relative to the vehicle body 110 by accelerating the reaction mass 942. In one example, the moment $\tau_{unsprung}$ of the unsprung mass 912 is calculated from a mass $M_{unsprung}$, the acceleration $A_{unspring}$, and a length $L_{unsprung}$ of the center of mass from the pivot axis of the unsprung mass 912. See Equation 1 below:

$$\tau_{unsprung} = M_{unsprung} \times A_{unsprung} \times L_{unsprung} \quad (1)$$

The damping force required $F_{required}$ by the inertial actuator 940 to achieve the required damping may thus be calculated as a function of a length $L_{IA}$ from the pivot axis at which the inertial actuator 940 applies the reaction force to the unsprung mass 912 and the moment $\tau_{unsprung}$ of the unsprung mass 912. See Equation 2 below:

$$F_{required} = \tau_{unsprung} / L_{IA} \quad (2)$$

The required damping force $F_{required}$ be calculated in other manners, for example, accounting for the angle at which the inertial actuator 940 applies the reaction force to the unsprung mass 912 or according to other equations (e.g., accounting for other parameters, such as latency of the sensors and/or the secondary actuator mechanism 946).

In a third unit 1030, a predicted state of the inertial actuator 940 is determined if the total required damping were to be performed by the inertial actuator 940. The predicted state may be determined from a current state of the inertial actuator 940 and a predicted state change of the inertial actuator 940. The predicted state of the inertial actuator 940 may, for example, be a predicted amount of mechanical energy $E_{predicted}$ to be stored (e.g., predicted stored energy) by the inertial actuator 940, or may be a predicted maximum displacement $D_{predictedmax}$ of the reaction mass 942 relative to the unsprung mass 912.

The predicted stored energy $E_{predicted}$ is an amount of energy predicted to be stored in mechanical form (i.e., kinetic energy $E_{kinetic}$ of the reaction mass 942 and potential energy $E_{potential}$ of the spring 944) at a subsequent time (e.g., t+1, where t equals the current time). The predicted energy stored $E_{predicted}$ is, for example, derived from the stored energy E_stored currently stored mechanically by the inertial actuator 940, which is the current state of the inertial actuator 940, and a predicted change ΔE_stored of the stored energy E_stored, which is the predicted state change of the store of the inertial actuator 940. See Equation 3 below:

$$E_{predicted} = E\_stored + \Delta E\_stored \quad (3)$$

The energy stored E_stored may be determined in a first subunit 1032, as the sum of the kinetic energy $E_{kinetic}$ of the reaction mass 942 and the potential energy $E_{potential}$ of the spring 944. See equation 4 below:

$$E\_stored = E_{kinetic} + E_{potential} \quad (4)$$

By knowing both the relative position $D_{reactionmass}$ and the velocity $V_{reactionmass}$ of the reaction mass 942, the stored energy E_stored of the inertial actuator 940 may be determined regardless of the relative position $D_{reactionmass}$ when the relative position $D_{reactionmass}$ (e.g., relative to a static position of the spring 944) and the velocity $V_{reactionmass}$ of the reaction mass 942 are determined. More particularly, the kinetic energy $E_{kinetic}$ of the reaction mass 942 may be calculated as a function of the mass $M_{reactionmass}$ of the reaction mass 942 and the velocity $V_{reactionmass}$ of the reaction mass 942. See Equation 5 below:

$$E_{kinetic} = \tfrac{1}{2} \times M_{reactionmass} \times V_{reactionmass}^2 \quad (5)$$

The velocity $V_{reactionmass}$ of the reaction mass 942 is received from the first unit 1010. The potential energy $E_{potential}$ of the spring 944 may be calculated in a second subunit 1034 as a function of the relative position $D_{reactionmass}$ of the reaction mass 942 and the spring constant K of the spring 944. See Equation 6 below:

$$E_{potential} = \tfrac{1}{2} \times K \times D_{reactionmass}^2 \quad (6)$$

The relative position $D_{reactionmass}$ of the reaction mass 942 is received from the first unit 1010. The predicted change ΔE_stored of the stored energy E_stored is determined according to the acceleration $A_{unsprung}$ of the unsprung mass 912. For example, the predicted change Δ E_stored may correspond to (e.g., equal) the amount of work $W_{unsprung}$ (e.g., the predicted work) to be performed by the secondary actuator mechanism 946 on the reaction mass 942, which may be calculated as a function of, the required damping force $F_{required}$, and an estimated change in the relative position $D_{reactionmass}$ of the reaction mass 942, which may, for example, be estimated from the velocity $V_{reactionmass}$ of the reaction mass 942 and a change of time ΔT. See Equation 7 below.

$$\Delta E\_stored = W_{unsprung} = F_{required} \times V_{reactionmass} \times \Delta T \quad (7)$$

The predicted change ΔE_stored may be determined directly from the acceleration $A_{unsprung}$ of the unsprung mass 912, as indicated by the dashed line 1034a (e.g., from an equation derived from Equations 1, 2, and 7 above). Alternatively, the predicted change ΔE_stored may be determined by first calculating the required damping force $F_{required}$ and, thereby, indirectly from the acceleration $A_{unsprung}$ of the unsprung mass 912, as indicated by solid line 1034b.

The predicted state of the inertial actuator 940 may instead be a predicted maximum displacement $D_{predictedmax}$ of the reaction mass 942. The predicted maximum displacement $D_{predictedmax}$ of the reaction mass 942 may be derived from the predicted stored energy $E_{predicted}$. For example, the reaction mass 942 may be considered to experience the predicted maximum displacement $D_{predictedmax}$ when the velocity $V_{reactionmass}$ is zero and, thereby, the kinetic energy $E_{kinetic}$ is equal to zero. Thus, the predicted maximum displacement $D_{predictedmax}$ of the reaction mass 942 may be derived from the predicted stored energy $E_{predicted}$ and the spring constant K of the spring 944. See Equation 8 below:

$$D_{predictedmax} = (2 \times E_{predicted}/K)^{1/2} \quad (8)$$

In a fourth unit 1040, it is predicted whether one or more capacities of the inertial actuator 940 will be exceeded if the total required damping force $F_{required}$ were to be applied by the inertial actuator 940. That is, it is determined whether the inertial actuator 940 can perform the required damping without the primary actuator. In a first subunit 1042, the predicted state is compared to one or more capacity thresholds of the inertial actuator 940. The capacity threshold may, for example, be the energy storage capacity $E_{capacity}$ of the inertial actuator 940 (e.g., energy storage capacity threshold), the stroke distance $D_{stroke}$ of the reaction mass 942 (e.g., threshold stroke distance), or a percentage P thereof (e.g., 80%). See Equations 9 and 10 below:

$$E_{predicted} > P \times E_{capacity} \quad (9)$$

$$D_{predictedmax} > P \times D_{stroke} \quad (10)$$

If Equation 9 is satisfied, then an energy capacity threshold of the inertial actuator 940 is predicted to be exceeded. If Equation 10 is satisfied, then a stroke distance threshold is predicted to be exceeded. Note that Equation 9, Equation 10, or both may be evaluated.

The fourth unit 1040 may include a second subunit 1044 in which the required damping force $F_{required}$ is compared to another capacity threshold (e.g., a force capacity threshold), which may be the damping force capacity $F_{capacity}$ of the inertial actuator 940, or a percentage P (e.g., 80%) thereof. See Equation 11 below:

$$F_{required} > P \times F_{capacity} \quad (11)$$

If Equation 11 is satisfied, then a force a capacity threshold is predicted to be exceeded. To account for reduced operability or inoperability of the inertial actuator 940, the capacity threshold (e.g., the force capacity $F_{capacity}$ and/or the percentage P) may vary depending on conditions of the inertial actuator 940 (e.g., temperature or failure). For example, upon detecting inoperability of the inertial actuator 940 (e.g., temporary or permanent failure of the secondary actuator mechanism 946, as referenced above), the percentage P or the force capacity $F_{capacity}$ may be zero.

In a fifth unit 1050, the required damping is allocated between the inertial actuator 940 and the primary actuator 930. That is, the required damping is determined to be performed cooperatively by the primary actuator 930 and the inertial actuator 940. If both the predicted state does not exceed the capacity threshold and the required damping force $F_{required}$ does not exceed the damping force capacity $F_{capacity}$, then an entirety of the required damping force $F_{required}$ is allocated to the inertial actuator 940, with no portion thereof being apportioned (e.g., offloaded) to the primary actuator 930. That is, the inertial actuator 940 is to perform the required damping at the natural frequency without the primary actuator 930. If the total energy $E_{predicted}$ to be stored exceeds the energy storage threshold, the damping force $F_{required}$ exceeds the threshold of the damping force capacity $F_{capacity}$, or both, then damping a the natural frequency is performed cooperatively by the inertial actuator and primary actuator 930 (e.g., the required damping force $F_{required}$ is apportioned between the inertial actuator 940 and the primary actuator 930, for example, as an inertial actuator force $F_{inertial}$ and a primary actuator force $F_{primary}$, respectively). That is a portion of the required damping force $F_{required}$ is allocated to the inertial actuator 940 and a remaining portion of the required damping force $F_{required}$ is allocated to the primary actuator 930. If the primary actuator 930 and/or the inertial actuator 940 act on the unsprung mass at different locations (e.g., relative to the pivot axis) and/or at different angles, the primary actuator force $F_{primary}$ of the primary actuator 930 may be determined to apply an equivalent moment to the unsprung mass, while accounting for such differences.

The required damping force $F_{required}$ may be allocated between the inertial actuator force $F_{inertial}$ and the primary actuator force $F_{primary}$ in different manners. For example, required damping force $F_{required}$ may be allocated according to a proportional-integral-derivative methodology, which apportions the required damping force $F_{required}$ between the primary actuator 930 and the inertial actuator 940 based on error between the predicted state and a threshold capacity (e.g., for energy storage and/or stroke distance) and/or based on error between the required damping force $F_{required}$ and the damping force capacity $F_{capacity}$ of the secondary actuator mechanism 946. In the case of the inoperabilty of the inertial actuator 940 (e.g., the percentage P or the force capacity $F_{capacity}$ is zero), no damping is performed by the inertial actuator 930, and damping of the unsprung mass at the characteristic frequency (e.g., the required damping) is performed by the primary actuator 930 without the inertial actuator 940.

In a sixth unit 1060, the primary actuator 930 and the inertial actuator 940 are controlled according to the allocation of the required damping (e.g., the required damping force $F_{required}$) between the primary actuator force $F_{primary}$ and the inertial actuator force $F_{inertial}$. For example, the suspension controller 118 may send a primary control signal 1063 to the primary actuator 930 and a secondary control signal 1064 to the inertial actuator 940, which request or cause the primary actuator 930 and the inertial actuator 940 to output the primary actuator force $F_{primary}$ and the inertial actuator force $F_I$. It should be noted that the primary actuator 930 may overlay additional force to the primary actuator 930, so as to damp or otherwise control motion outside the characteristic frequency range (e.g., at a low frequency). As such, the primary control signal 1063 may request a combination (e.g., overlay) of the primary actuator force $F_{primary}$ and the additional force.

A method of damping may be performed by the vehicle 100 accordance with the various units of the control system 1000. For example, the method includes monitoring, determining required damping, determining a predicted state of the inertial actuator, determining whether capacity thresholds of the inertial actuator would be exceeded, allocating the required damping between the inertial actuator and the primary actuator, and controlling the inertial actuator and the primary actuator according to the allocation to perform the required damping. The monitoring includes monitoring the inertial actuator (e.g., the position and velocity of the reaction mass 942) and monitoring the unsprung mass 912 (e.g., the vertical acceleration thereof). Determining the required damping is performed according to the acceleration of the unsprung mass. Determining a predicted state of the inertial actuator is performed according to the required damping being performed only by the inertial actuator (e.g., determining a predicted amount of energy stored thereby). Determining whether performing the required damping would exceed the one or more capacity thresholds of the inertial actuator, includes comparing the predicted state to the capacity threshold. Allocating the required damping is performed according to whether the one or more capacity thresholds of the inertial actuator would be exceeded. Controlling the inertial actuator and the primary actuator according to the allocation, includes controlling the inertial actuator to perform up to an entirety of the required damping and controlling the primary actuator to performing any remaining portion of the required damping (e.g., according to a proportional, integral, derivative methodology).

Figure 11:
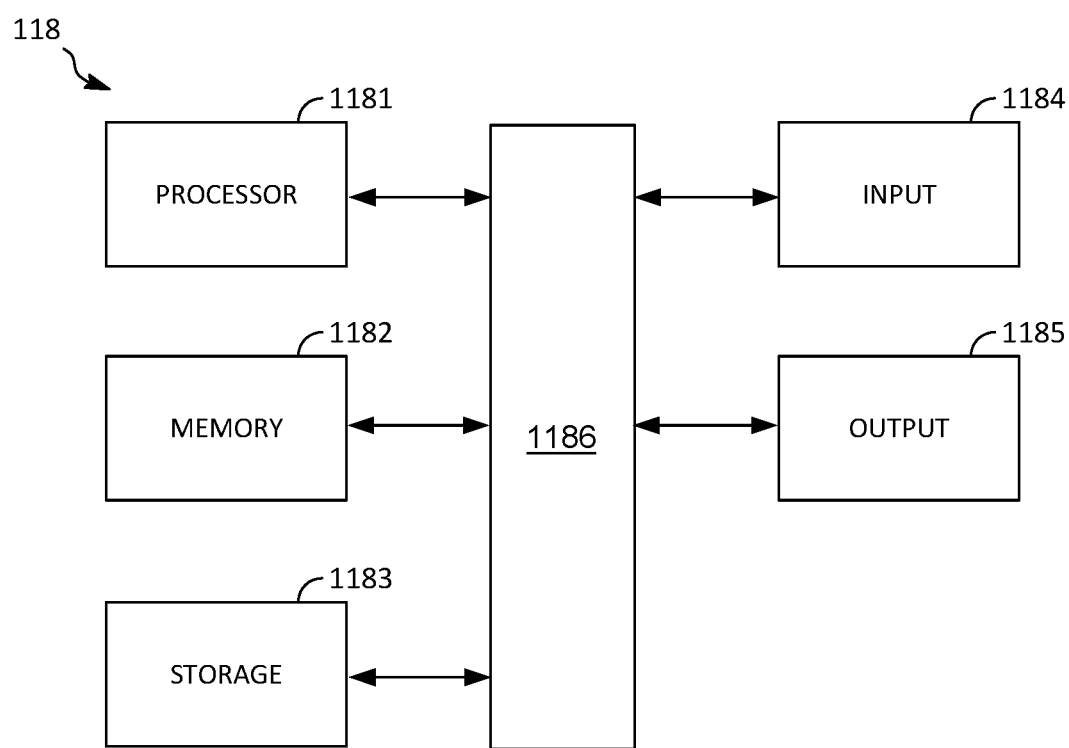
FIG. 11 is a schematic view of a controller of the vehicle of FIG. 1 and for controlling the suspension actuators the various other figures and for implementing the control system of FIG. 10.

Referring to FIG. 11, a hardware configuration for the controller 118, which may implement the control system 1000 and/or otherwise control the actuators described herein, is shown. The controller 118 may include a processor 1181, a memory 1182, a storage device 1183, one or more input devices 1184, and one or more output devices 1185. The controller 118 may include a bus 1186 or a similar device to interconnect the components for communication. The processor 1181 is operable to execute computer program instructions and perform operations described by the computer program instructions, such as the units of the control system 1000 described previously. As an example, the processor 1181 may be a conventional device such as a central processing unit. The memory 1182 may be a volatile, high-speed, short-term information storage device such as a random-access memory module. The storage device 1183 may be a non-volatile information storage device such as a hard drive or a solid-state drive. The input devices 1184 may include any input source, such as the various sensors of the suspension systems described herein (e.g., position sensors and/or accelerometers). The output devices 1185 may include any type of system or device for providing an output, such as the powertrain system 112, the energy storage system 114, the steering system 116, and the suspension system 120.

What is claimed is:

1. A suspension system for a vehicle comprising:
   a primary actuator for applying force between a sprung mass and an unsprung mass of the vehicle to control movement therebetween;
   an inertial actuator for applying force between the unsprung mass and a reaction mass to damp movement of the unsprung mass at a natural frequency of the unsprung mass, the inertial actuator having a capacity threshold; and
   a control system that controls the force applied by the primary actuator and the force applied by the inertial actuator to damp the unsprung mass at the natural frequency according to the capacity threshold;
   wherein the control system determines whether the capacity threshold of the inertial actuator will be exceeded by performing a required damping with the inertial actuator without the primary actuator, and if the capacity threshold will be exceeded, the control system controls the inertial actuator and the primary actuator to cooperatively damp the unsprung mass at the natural frequency.

2. The suspension system according to claim 1, wherein to determine whether the capacity threshold will be exceeded, the control system determines a predicted state of the inertial actuator according to the required damping, and compares the predicted state to the capacity threshold.

3. The suspension system according to claim 2, wherein the predicted state is a predicted amount of mechanical energy to be stored by the inertial actuator, and the capacity threshold is an energy storage capacity threshold.

4. The suspension system according to claim 3, wherein the control system determines the predicted amount of mechanical energy to be stored according to a position of the reaction mass, a velocity of the reaction mass, and an acceleration of the unsprung mass.

5. The suspension system according to claim 4, wherein the inertial actuator further includes a spring coupled to and extending between the reaction mass and the unsprung mass, and the predicted amount of mechanical energy includes kinetic energy of the reaction mass and potential energy of the spring.

6. The suspension system according to claim 2, wherein the predicted state is a predicted maximum displacement of the reaction mass, and the capacity threshold is a threshold stroke distance of the reaction mass.

7. The suspension system according to claim 6, wherein the control system determines the predicted maximum displacement according to a position of the reaction mass, a velocity of the reaction mass, and an acceleration of the unsprung mass.

8. The suspension system according to claim 1, wherein if the inertial actuator is inoperable, the control system controls the primary actuator and not the inertial actuator to damp the unsprung mass at the natural frequency.

9. The suspension system according to claim 8, wherein the capacity threshold of the inertial actuator is zero if inoperable.

10. The suspension system according to claim 1, wherein if the capacity threshold will not be exceeded, the control system controls the inertial actuator to perform the required damping without the primary actuator.

11. The suspension system according to claim 1, wherein the control system controls the primary actuator and the inertial actuator to cooperatively damp the unsprung mass according to a proportional-integral-derivative control methodology.

12. The suspension system according to claim 1, wherein the capacity threshold is one of an energy storage capacity, a stroke distance of the reaction mass, or a force capacity of the inertial actuator.

13. The suspension system according to claim 1, wherein the unsprung mass includes a wheel of the vehicle, and the sprung mass includes a vehicle body of the vehicle.

14. The suspension system according to claim 1, wherein a required damping is determined according to acceleration of the unsprung mass to damp movement of the unsprung mass at the natural frequency, and the control system controls the force applied by the primary actuator and the force applied by the inertial actuator to perform the required damping according to the capacity threshold.

15. The suspension system according to claim 1, wherein the control system further determines a required damping force of the inertial actuator for achieving the required damping, and if the control system determines that the required damping force exceeds a force capacity threshold of the inertial actuator, the control system controls the inertial actuator and the primary actuator to cooperatively damp the unsprung mass at the natural frequency.

16. The suspension system according to claim 1, wherein the unsprung mass includes a wheel of the vehicle, and the sprung mass includes a vehicle body of the vehicle;

wherein a required damping is determined according to acceleration of the unsprung to damp movement of the unsprung mass at the natural frequency;

wherein if the capacity threshold will not be exceeded, the control system controls the inertial actuator to perform the required damping without the primary actuator;

wherein the capacity threshold is an energy storage threshold, and to determine whether the capacity threshold will be exceeded, the control system determines a predicted amount of energy to be stored by the inertial actuator according to a position of the reaction mass, a velocity of the reaction mass, and an acceleration of the unsprung mass, the predicted amount of energy including kinetic energy of the reaction mass and potential energy of a spring of the inertial actuator between the reaction mass and the unsprung mass; and wherein the control system determines a required damping force of the inertial actuator for achieving the required damping, and if the control system determines that the required damping force exceeds a force capacity threshold of the inertial actuator, the control system controls the inertial actuator and the primary actuator to cooperatively perform the required damping.

17. A control system for a suspension system of a vehicle, wherein the vehicle includes a sprung mass and an unsprung mass, and the suspension system includes a primary actuator for applying force between the sprung mass and the unsprung mass and includes an inertial actuator for applying force between the unsprung mass and a reaction mass, the control system comprising:
 a position sensor for measuring a position and a velocity of the reaction mass relative to the unsprung mass;
 an accelerometer for measuring acceleration of the unsprung mass; and
 a controller that:
  determines, according to the acceleration, a required damping of the unsprung mass at a natural frequency of the unsprung mass;
  determines, according to the acceleration, the position, and the velocity, a predicted state of the inertial actuator if the required damping were performed by the inertial actuator without the primary actuator; and
  compares the predicted state to a capacity threshold of the inertial actuator, and if the predicted state exceeds the capacity threshold, controls the inertial actuator and the primary actuator to cooperatively perform the required damping.

18. The control system according to claim 17, wherein the predicted state is determined according to a current state of the inertial actuator and a predicted state change of the inertial actuator, the current state being determined according to the position and the velocity of the reaction mass, and the predicted state change being determined according to the acceleration of the unsprung mass and the velocity of the reaction mass.

19. The control system according to claim 18, wherein the capacity threshold is an energy storage capacity of the inertial actuator, the current state includes kinetic energy of the reaction mass and potential energy of a spring of the inertial actuator, and the predicted state change includes predicted work to be performed on the reaction mass to perform the required damping.

20. The control system according to claim 17, wherein if the predicted state does not exceed the capacity threshold, the controller controls the inertial actuator to perform the required damping without the primary actuator.

21. The control system according to claim 17, wherein the capacity threshold is zero if the inertial actuator is inoperable, and the controller controls the primary actuator to perform the required damping without the inertial actuator when the capacity threshold is zero.

22. The control system according to claim 17, wherein the controller further:
 determines a required damping force for the inertial actuator to perform the required damping without the primary actuator, and
 compares the required damping force to a force capacity threshold of a secondary actuator of the inertial actuator, and if the required damping force exceeds the force capacity threshold, controls the inertial actuator and the primary actuator to cooperatively perform the required damping.

23. A method for controlling a suspension system of a vehicle, the method comprising:
 determining, with a controller, a required damping of an unsprung mass at a natural frequency of the unsprung mass, the unsprung mass including a wheel of the vehicle;
 determining, with the controller, whether an inertial actuator can perform an entirety of the required damping without exceeding a capacity threshold of the inertial actuator, the inertial actuator including a reaction mass and an actuator mechanism for applying force between the unsprung mass and the reaction mass;
 controlling, with the controller, the inertial actuator and a primary actuator to cooperatively perform the required damping if the inertial actuator cannot perform the entirety of the required damping, the primary actuator being configured to apply force between the unsprung mass and a sprung mass of the vehicle.

24. The method of claim 23, further comprising monitoring a position and a velocity of a reaction mass of the inertial actuator and monitoring an acceleration of the unsprung mass; wherein:
 the controller determines the required damping from the acceleration;
 the controller determines whether the inertial actuator can perform the entirety of the required damping by determining a predicted state of the inertial actuator according to the position of the reaction mass, the velocity of the reaction mass, and the acceleration of the unsprung mass, and determines whether the predicted state exceeds the capacity threshold of the inertial actuator;
 the controller controls the primary actuator and the inertial actuator to cooperatively provide the required damping if the capacity threshold is determined to be exceeded by the predicted state; and
 the controller controls the inertial actuator to perform the entirety of the required damping if the capacity threshold is determined to not be exceeded by the predicted state.

25. The method of claim 24, wherein the capacity threshold is an energy storage capacity of the inertial actuator, and the predicted state is an amount of mechanical energy stored by the inertial actuator.

26. The method of claim 24, further comprising:
 determining, with the controller, a required damping force of the inertial actuator to achieve the required damping, and whether the required damping force exceeds a force capacity threshold of the inertial actuator;
 controlling, with the controller, the inertial actuator and the primary actuator to cooperatively perform the required damping if the required damping force exceeds the force capacity threshold.

* * * * *